United States Patent
Stilwell et al.

(10) Patent No.: US 7,310,060 B2
(45) Date of Patent: Dec. 18, 2007

(54) MULTI-MODE LANDMINE DETECTOR

(75) Inventors: Gregory Stilwell, Orlando, FL (US); Geoffrey Solomon, Maitland, FL (US); Richard McCoy, Winter Park, FL (US); Steve McCarthy, Ocoee, FL (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 0 days.

(21) Appl. No.: 11/191,149

(22) Filed: Jul. 28, 2005

(65) Prior Publication Data

US 2006/0284758 A1    Dec. 21, 2006

Related U.S. Application Data

(63) Continuation-in-part of application No. 10/918,736, filed on Aug. 16, 2004.

(60) Provisional application No. 60/591,617, filed on Jul. 28, 2004, provisional application No. 60/495,871, filed on Aug. 19, 2003, provisional application No. 60/495,084, filed on Aug. 15, 2003.

(51) Int. Cl.
*G01V 3/12* (2006.01)
*G01S 13/88* (2006.01)

(52) U.S. Cl. ................ 342/22; 342/52; 324/326

(58) Field of Classification Search ........... 342/22
See application file for complete search history.

(56) References Cited

U.S. PATENT DOCUMENTS

| | | | | |
|---|---|---|---|---|
| 3,896,371 A | * | 7/1975 | Hametta | 324/327 |
| 4,099,116 A | * | 7/1978 | Tyndall | 324/329 |
| 4,334,192 A | * | 6/1982 | Podhrasky | 324/329 |
| 4,439,734 A | * | 3/1984 | Weber | 324/327 |
| 5,307,272 A | * | 4/1994 | Butler et al. | 700/90 |
| 5,680,048 A | * | 10/1997 | Wollny | 324/329 |
| 5,786,696 A | * | 7/1998 | Weaver et al. | 324/329 |
| 6,026,135 A | * | 2/2000 | McFee et al. | 376/159 |
| 6,097,190 A | * | 8/2000 | Foerster | 324/329 |
| 6,415,666 B1 | * | 7/2002 | Donskoy et al. | 73/627 |
| 6,657,577 B1 | * | 12/2003 | Gregersen et al. | 342/22 |
| 6,679,153 B2 | * | 1/2004 | Inoue et al. | 89/1.13 |
| 6,950,054 B1 | * | 9/2005 | Steinway et al. | 342/22 |
| 2003/0136249 A1 | * | 7/2003 | Inoue et al. | 89/1.13 |
| 2003/0160617 A1 | * | 8/2003 | Rowan | 324/329 |
| 2003/0193429 A1 | * | 10/2003 | Campana et al. | 342/22 |

OTHER PUBLICATIONS

Sun, Y. and Li, J. "Time-frequency analysis for plastic landmine detection via forward-looking ground penetrating radar". IEEE Proceedings—Radar, Sonar and Navigation. Aug. 2003, vol. 150. Issue 4, pp. 253-261.*

* cited by examiner

*Primary Examiner*—Thomas H. Tarcza
*Assistant Examiner*—Matthew M Barker
(74) *Attorney, Agent, or Firm*—Fish & Richardson P.C.

(57) ABSTRACT

An multi-mode target detection system includes a ground penetrating metal detector and a ground penetrating radar detector permitting operation of the system in a variety of target detection modes. The system includes a control section having a selection device for selecting at least two operating modes from the group consisting of a buried land mine detection mode, a through wall detection mode, a perimeter warning mode, a buried cache detection mode and an in-wall cache detection mode.

35 Claims, 29 Drawing Sheets

MULTI-MODE LANDMINE DETECTOR

CROSS-REFERENCE TO RELATED APPLICATIONS

This application is a continuation-in-part application of and claims priority to U.S. application Ser. No. 10/918,736, filed on Aug. 16, 2004, which claimed priority to U.S. Provisional Application No. 60/495,871 filed on Aug. 19, 2003 and U.S. Provisional Application No. 60/495,084 filed on Aug. 15, 2003, all of which are incorporated by reference. This application also claims priority to U.S. Provisional Application No. 60/591,617 filed on Jul. 28, 2004, which also is incorporated by reference.

TECHNICAL FIELD

This document relates to the detection of buried landmines and other targets.

BACKGROUND

Landmines are area denial weapons and are intended to slow, re-direct or obstruct the mobility of military forces. The landmine threat usually continues long after the conflict ends, posing great risk to the civilian population. Since World War II, handheld landmine detection has been based on the metal detector. Unlike older metal-cased landmines, today's modern anti-tank and anti-personnel mines are made primarily of plastic and have very little metal content. Landmines by their very nature are laid in areas of conflict, and the surrounding soil typically contains high levels of metal clutter, e.g., shrapnel and metal shell casings. This clutter significantly increases the difficulty of finding modern mines using only a metal detector.

SUMMARY

In one general aspect a multi-mode mine detection system includes a ground penetrating metal detector, a ground penetrating radar detector and a control section having a selection device for selecting at least two operating modes from the group consisting of a buried land mine detection mode, a through wall detection mode, a perimeter warning mode, a buried cache detection mode and an in-wall cache detection mode.

Implementations may include one or more of the following features. For example, the ground penetrating metal detector may include a transmitter, a coil coupled to the transmitter to produce a magnetic field, and a signal processor coupled to the coil and configured to detect a secondary magnetic field.

The ground penetrating radar detector may include a radio frequency generator. The radio frequency transmitter may be coupled to the radio frequency generator to transmit radio-wave signals toward the ground.

The ground penetrating radar detector may include a radio frequency receiver that receives radio-wave signals from the ground, and a signal processor coupled to the radio frequency receiver to detect the radio-wave signals, wherein the radio frequency receiver includes an antenna.

The operating modes supported by the control section may include one or more, or all of the buried land mine detection mode, the through wall detection mode, the perimeter warning mode, the buried cache detection mode and the in-wall cache detection modes.

The metal detector may include a coil that produces a magnetic field and the radar detector may include a transmitting antenna that transmits radio-wave signals toward the ground and a receiving antenna that receives radio-wave signals reflected from objects within the ground. The antennas may be surrounded by the coil and the antennas may be shielded from external electromagnetic radiation.

An output device may be provided that outputs a signal indicating a presence of an object if either the ground penetrating metal detector, the ground penetrating radar detector, or both detect the presence of the object.

The ground penetrating radar detector and the ground penetrating metal detector may be housed in a single housing. The operation of the metal detector may not interfere with operation of the radar detector.

The system may include an output device for indicating a detection of a target in the at least two operating modes. The output device may includes a visual display, an audio alarm and/or a visual alarm.

In another general aspect, a target detection system may include an integrated search device housing a radio-wave transmitter and a metal detector coil. The system may include a first set of electronic components coupled to the radio transmitter. The system may include a second set of electronic components coupled to the metal detector coil. The system may include a processor for detecting a target through at least two modes that may be selected from the group consisting of a buried land mine detection mode, a through wall detection mode, a perimeter warning mode, a buried cache detection mode and an in-wall cache detection mode.

Implementations may include one or more of the following features. The system may include a radio-wave receiver, wherein the radio-wave transmitter and receiver may be shielded from external electromagnetic radiation. The operating modes supported by the control section may include all of the buried land mine detection mode, the through wall detection mode, the perimeter warning mode, the buried cache detection mode and the in-wall cache detection mode.

The system may include an output device for indicating a detection of a target in the at least two operating modes. The output device may includes a visual display, an audio alarm and/or a visual alarm.

In another general aspect, a method of detecting targets in a multi-mode target detection system may include selecting an operating mode for detecting a target, wherein the operating mode may be selected from the group consisting of a buried land mine detection mode, a through wall detection mode, a perimeter warning mode, a buried cache detection mode and an in-wall cache detection mode. The method may include transmitting radio-wave frequency energy into a surrounding region. The method may include detecting radio-wave frequency energy reflected by an object in the surrounding region. The method may include analyzing data obtained from transmitting and detecting radio-wave frequency to detect the target in the selected operating mode.

Implementations may include one or more of the following features. Selecting the operating mode may include initiating a predetermined data processing step for the selected operating mode.

In another general aspect, a method of detecting targets may include providing a detection system having a metal detector and a radar detector for collecting and analyzing data taken from a surrounding region. The method may include selecting an operating mode for detecting a target, wherein the operating mode may be selected from the group consisting of a buried land mine detection mode, a through wall detection mode, a perimeter warning mode, a buried cache detection mode and an in-wall cache detection mode. The method may include detecting the target with the detection system.

Implementations may include one or more of the following features. Detecting the target with the detection system may include analyzing data taken from the surrounding region using the metal detector, and analyzing data taken from the surrounding region using the radar detector.

The method may include training the detection system using a principal components analysis of the background clutter data. Detecting the target with the detection system may include Doppler processing of data from the radar detector. The Doppler processing of data from the radar detector may be performed during the through wall detection mode and the perimeter warning mode. Detecting the target with the detection system during the through wall detection mode may further include analyzing data taken from the surrounding region using the metal detector.

The method may include automatically adapting the detection system to the surrounding region to determine whether a mine is present in the surrounding region. Adapting the detection system includes using a principal components analysis of the data taken from the surrounding region.

The method may include analyzing data taken from the surrounding region using a metal detector. The method may include analyzing data taken from the surrounding region using a radar detector based on the training. The method may include analyzing a depth of an object detected by the radar detector using the data. Analyzing the depth of the object may include transforming data from the radar detector from the frequency domain to the time domain. Analyzing the depth includes receiving data from two or more antennas of the radar detector. Analyzing data taken from the surrounding region using the radar detector may include using a principal component analysis of the data.

Aspects of the techniques and systems can include one or more of the following advantages. The mine detection system uses both a radar detector and a metal detector to improve detection for mines and reduce the false alarm rate. Metal debris can mask the detection of mines. Because of this, a metal detector alone might not detect the presence of a mine among metal debris. Additionally, a metal detector alone might falsely issue an alarm over metal debris even in the absence of a mine because the metal detector cannot always distinguish metal debris from mines. Accordingly, the mine detection system, which uses a radar detector in addition to a metal detector, is able to reject metallic battlefield debris that otherwise creates a significant signal.

Because clutter data (data from features other than mines) is the only data used to train the model of radar detector response to current ground conditions, the training and adaptation of the radar detector model is easier to perform than the training an adaptation of those models requiring both clutter and mine data for training. Adaptation of the model to new environments is done automatically and on the fly, which reduces human resources and costs of training associated with operation of the mine detection system. Collection of clutter data is easier to implement than collection of mine data, which requires collection of mine data for every site before use of the system.

Other features and advantages will be apparent from the description, the drawings, and the claims.

DESCRIPTION OF DRAWINGS

Like reference symbols in the various drawings indicate like elements.

DETAILED DESCRIPTION

Figure 1:
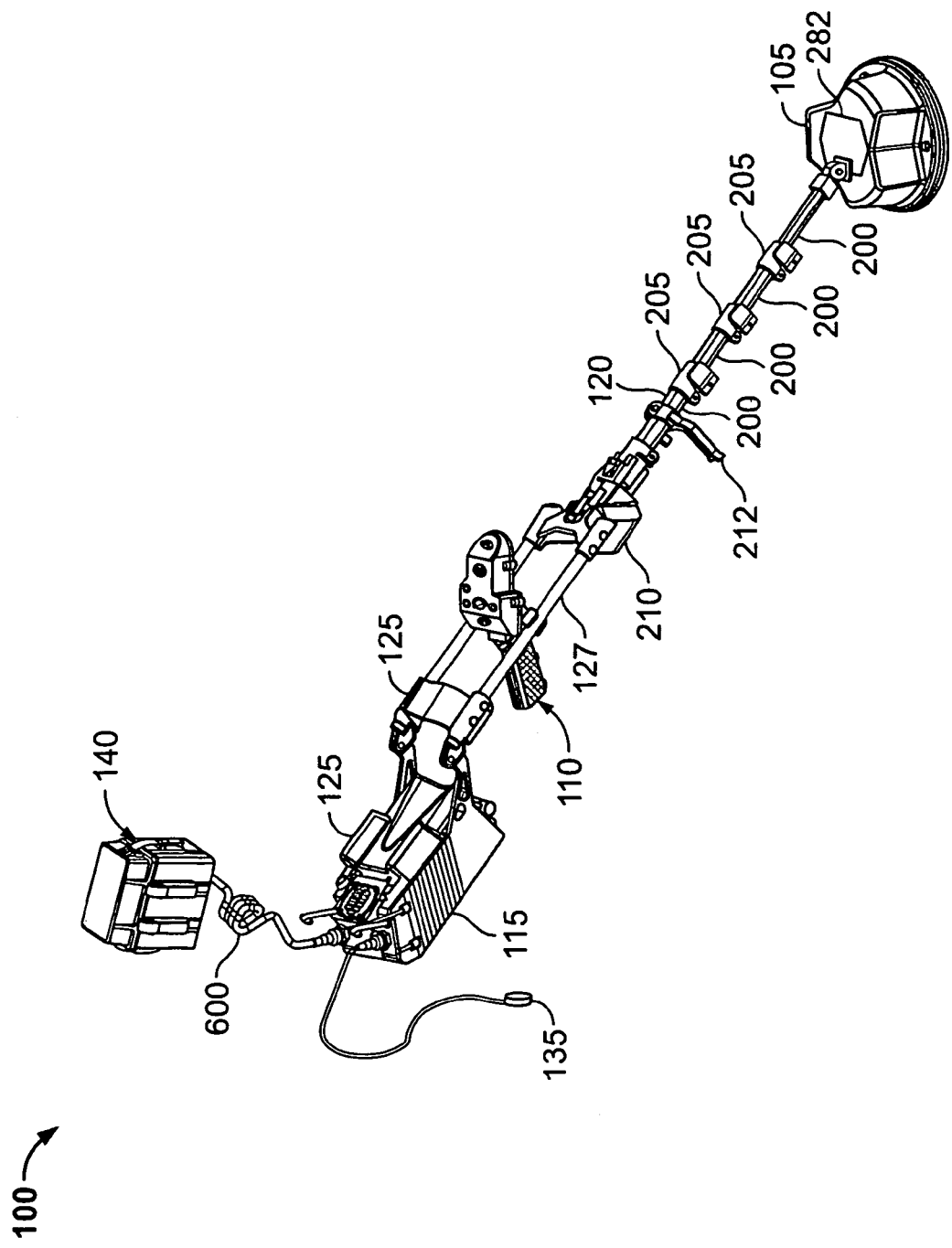
FIG. 1 is a perspective view of a mine detection system.

Referring to FIGS. 1, 2, 13, and 14, an integrated mine detection system 100 incorporates a metal detector 1350 (FIG. 13) and a radar detector 1450 (FIG. 14) into a single integrated system for detecting mines, including those mines that would otherwise not be detected solely with the use of a metal detector. The mine detection system 100 includes a search device 105, an interface controller 110, and an electronics unit 115. The search device 105 connects to the electronics unit 115 through a bundled set of wires 106 and the interface controller 110 connects to the electronics unit 115 through a bundled set of wires 111. To ensure that internal electronics are kept dry and secure, the bundled sets 106 and 111 enter the search device 105 and the electronics unit 115 through weatherproof seals 116. In general, the metal detector 1350 and the radar detector 1450 each include a set of electronics within the unit 115 and transmitting and receiving components within the search device 105, as further described below.

The mine detection system 100 includes an elongated shaft 120 coupled to the search device 105, and an armrest 125 coupled to the shaft 120 with a cradle 127. The interface controller 110 is attached to the shaft 120 to enable a user to access the interface controller 110 with a first arm while resting her second arm in the armrest 125.

The mine detection system 100 also includes one or more audio output devices, such as an earpiece 135 that is coupled to the electronics unit 115 and a speaker 137 (shown in FIG. 2) within the electronics unit 115. A power source such as a battery pack 140 is coupled to the electronics unit 115 to provide power to the unit 115.

Figure 3:
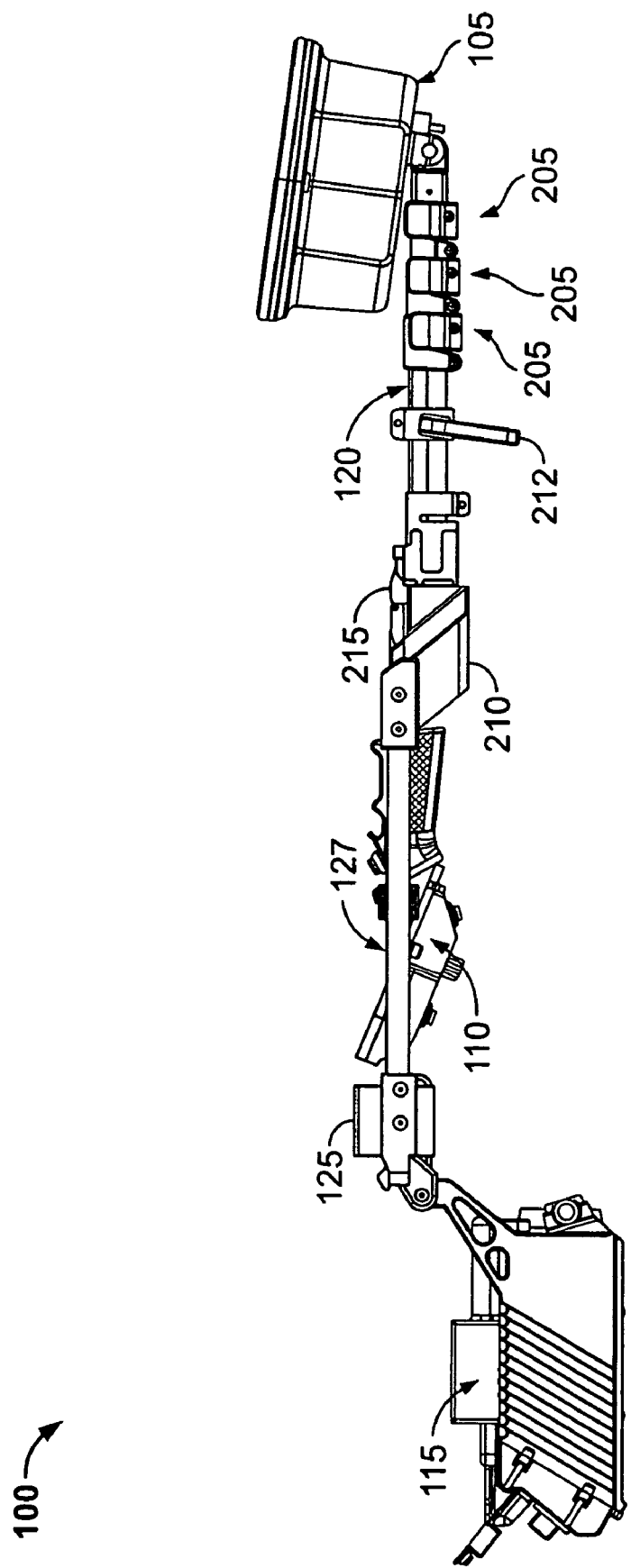
FIG. 3 is a side view of the mine detection system of FIG. 1 partially opened from storage.
Figure 4:
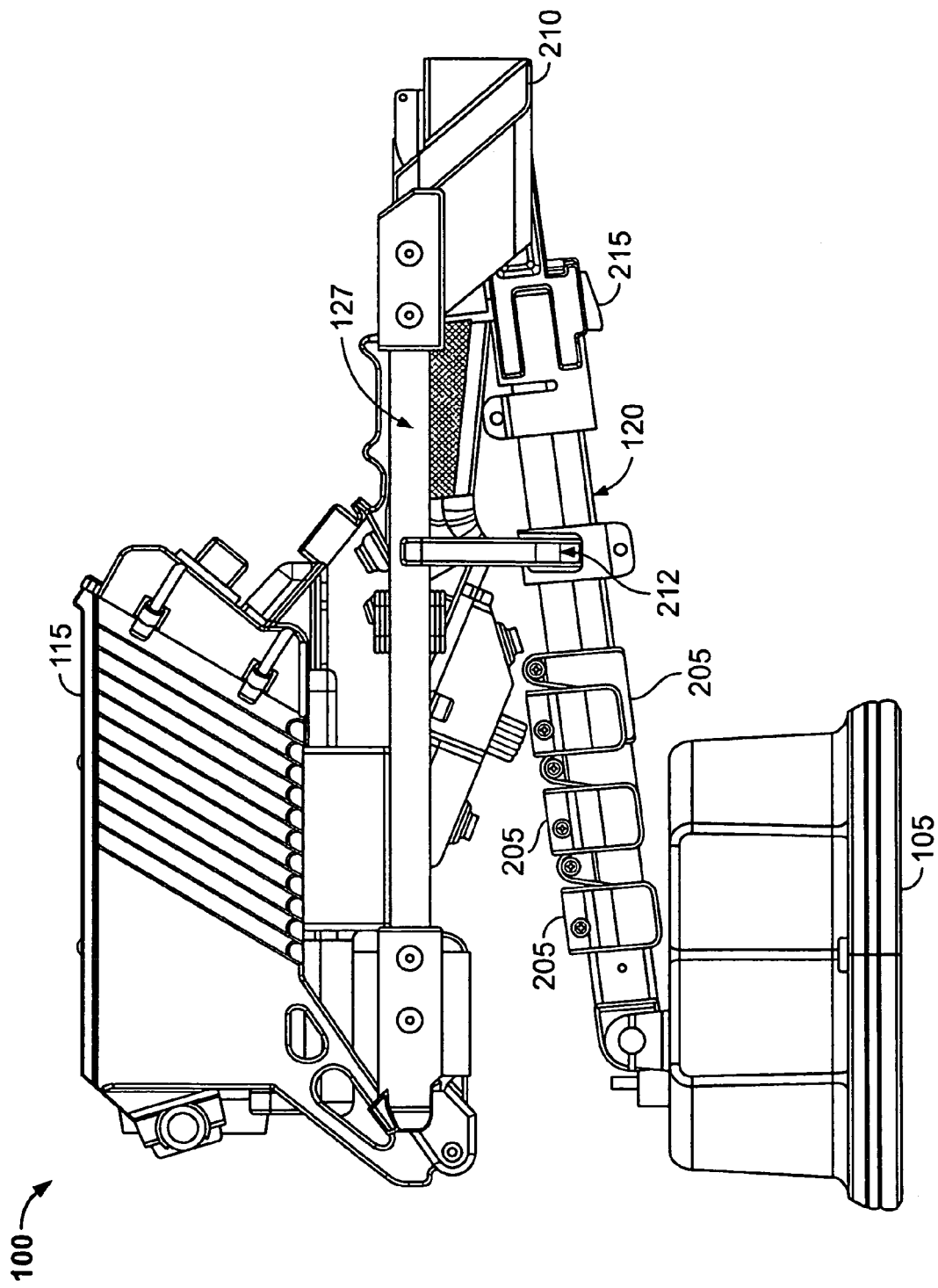
FIG. 4 is a side view of the mine detection system of FIG. 1 ready for storage.

FIGS. 3 and 4 show the mine detection system 100 without the battery pack 140 and the earpiece 135. The shaft 120 is telescoping and is made of segments 200 that slide into each other to adjust the length of the shaft 120 to accommodate the particular height of the user and to accommodate compact storage (as detailed below). Each of the segments 200 is secured in place relative to the adjacent segments 200 with a set of clamps 205 positioned between each pair of adjacent segments 200. Upon loosening a clamp, the smaller segment 200 can be slid into the adjacent larger segment 200, as shown in FIG. 3.

The shaft 120 is able to be folded relative to the cradle 127 at a joint 210. The shaft 120 includes a latching yoke 212 that secures the shaft 120 to the cradle 127 with a friction fit when the shaft 120 is folded relative to the cradle 127. The shaft 120 is secured in the open (unfolded) position relative to the cradle 127 by use of a latch 215 at the joint 210.

Figure 5:
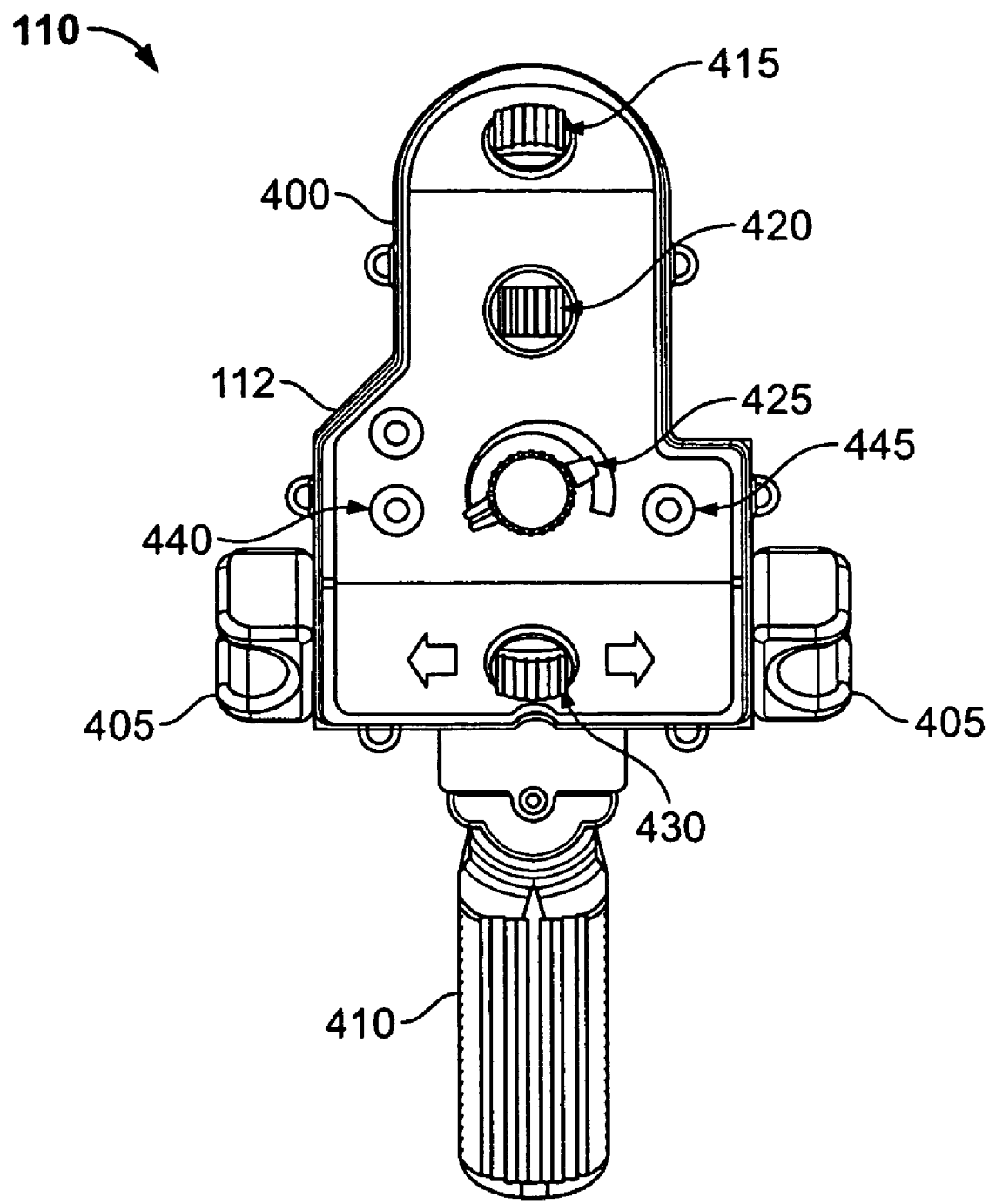
FIGS. 5 and 6 are, respectively, front and side perspective views of an interface controller of the mine detection system of FIG. 1.
Figure 6:
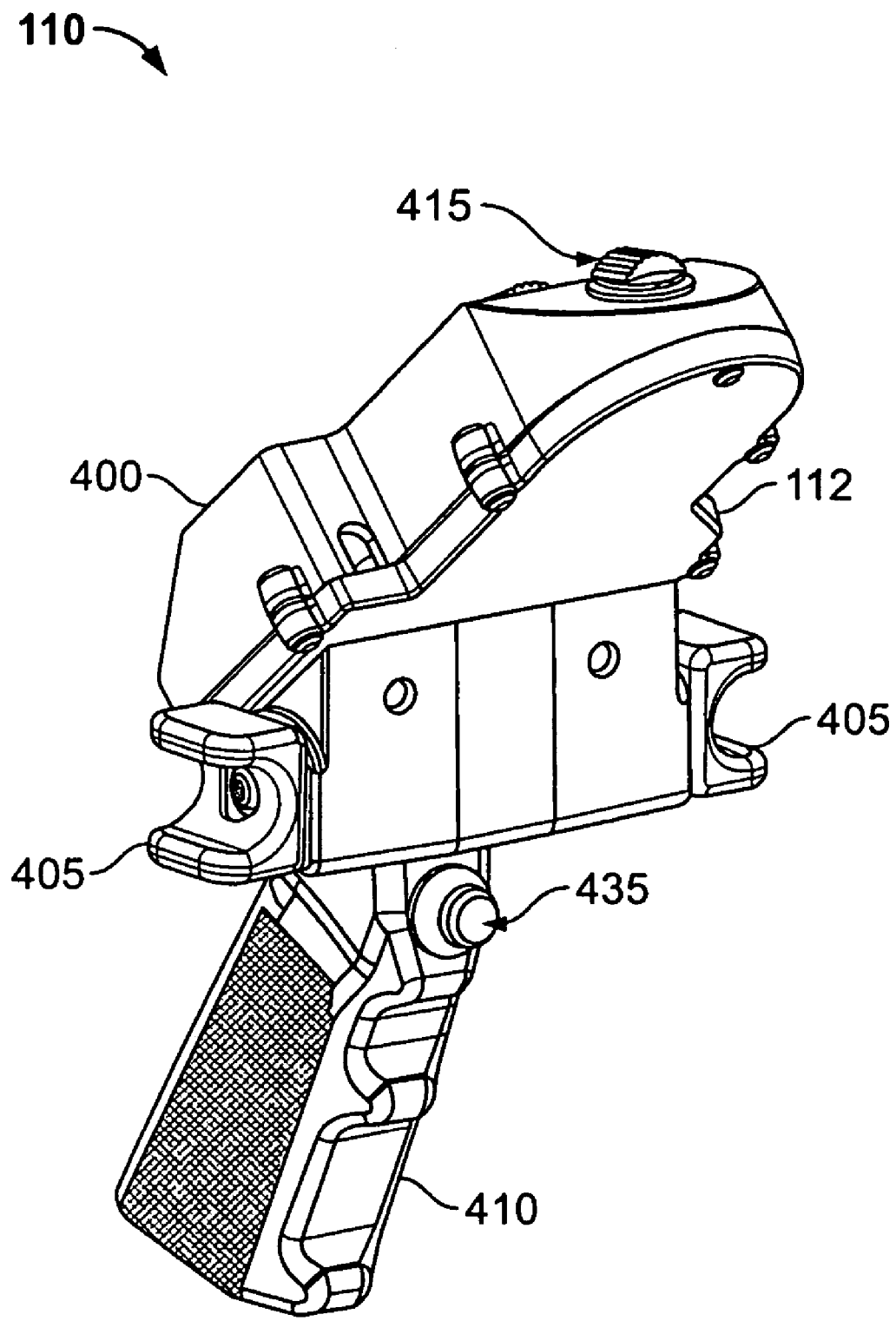

Referring also to FIGS. 5 and 6, the interface controller 110 includes a control section 400, a pair of clamps 405, and a handle 410 extending from the control section 400. The clamps 405 are sized to receive the cradle 127 with a friction fit to secure the controller 110 to the cradle 127. The interface controller 110 includes a housing 112 that houses all of its internal components and provides the control section 400, the clamps 405, and the handle 410. The housing 112 of the controller 110 can be made of any suitably durable material, such as, for example, molded plastic.

The control section 400 includes a set of switches that enable a user to control operation of the mine detection system 100. The set of switches includes a power switch 415, a metal detection control switch 420, a radar sensitivity switch 425, an audio control switch 430, and a trigger switch 435. The control section 400 also includes a set of indicators that provide feedback to a user of the mine detection system 100. The set of indicators includes a ready indicator 440 and a power and function indicator 445.

Figure 7:
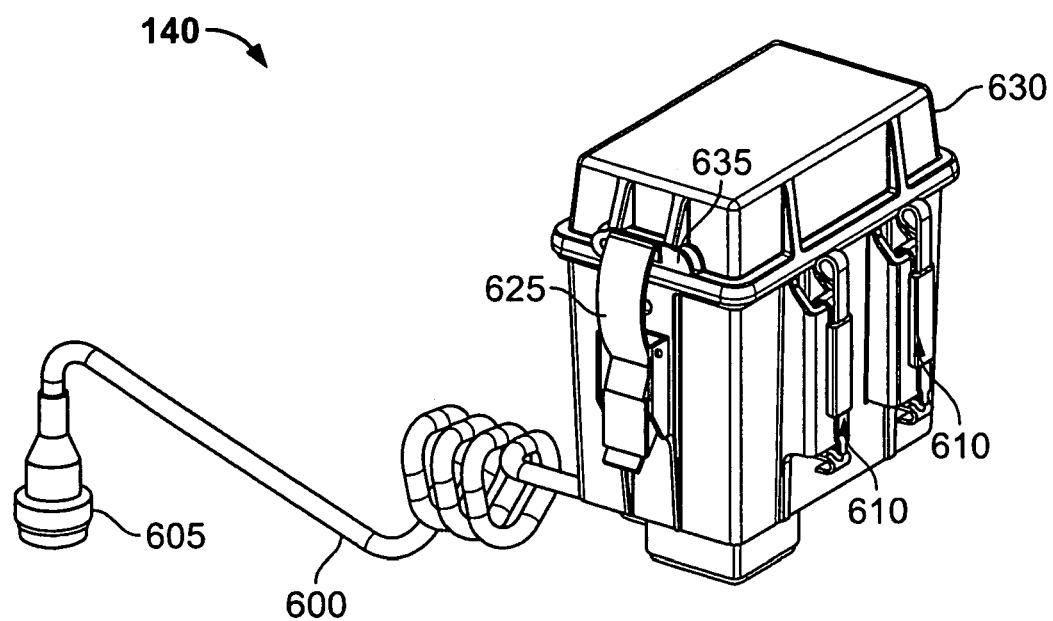
FIG. 7 is a perspective view of a battery pack of the mine detection system of FIG. 1.
Figure 8:
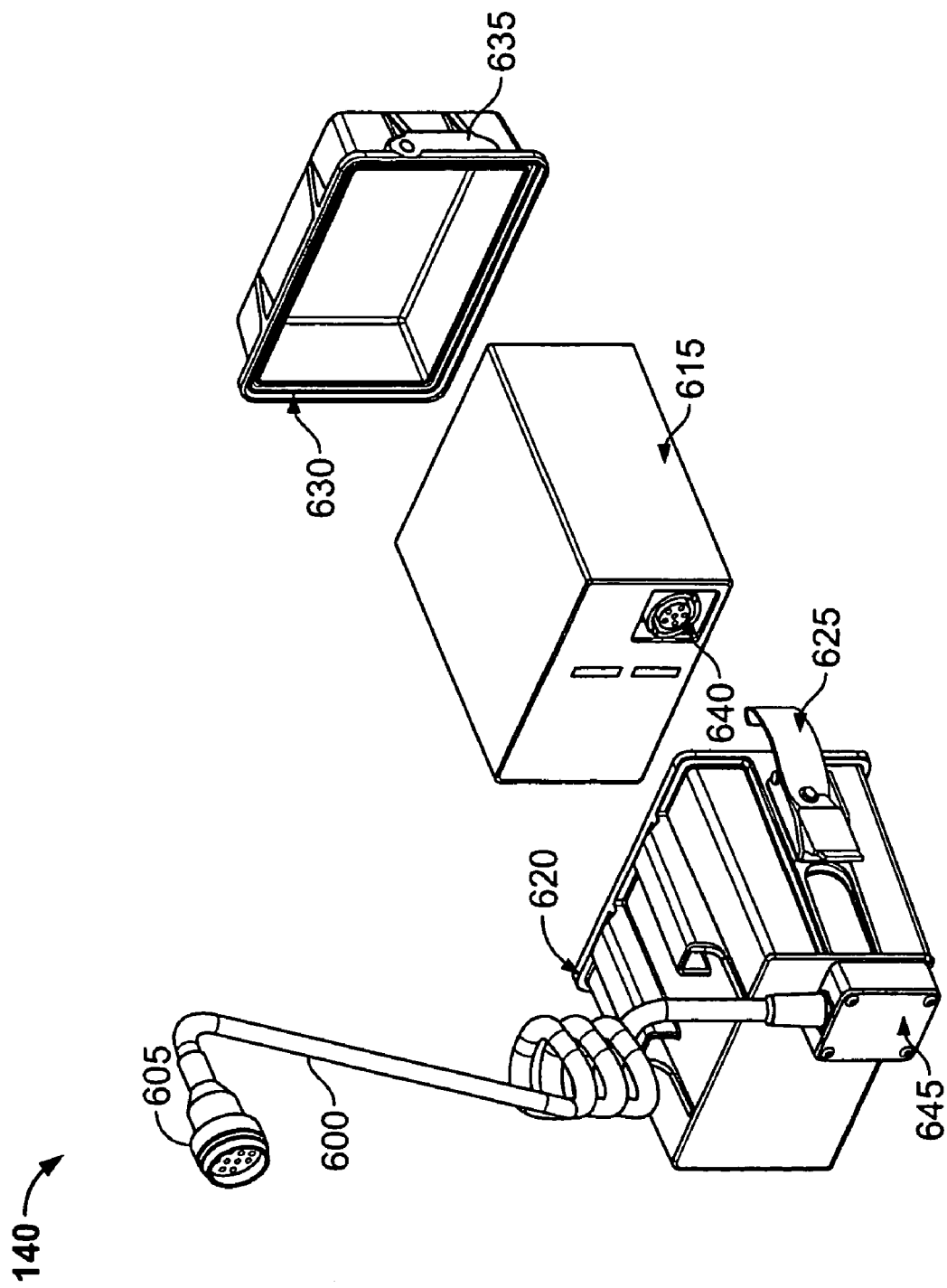
FIG. 8 is an exploded perspective view of the battery pack of FIG. 7.

Referring also to FIGS. 7 and 8, the battery pack 140 is connected to the electronics unit 115 with a cable 600 and a connector 605 (such as a circular twist lock connector) that mates with a connector 900 (shown in FIGS. 2 and 10) on the electronics unit 115. The battery pack 140 includes a pair of clips 610 that can be used to attach the battery pack 140 to a belt on a user. The battery pack 140 houses a battery 615 within a case 620 having latches 625 and a lid 630 having a lip 635. The case 620 and the lid 630 mate with each other and are secured to each other when the latches 625 lock to the lip 635. The case 620 and the lid 630 can be made of any non-metallic durable material, such as, for example, molded plastic. The battery 615 includes a connector 640 that mates with a connector 645 of the case 620 when the battery 615 is housed within the case 620.

Figure 9:
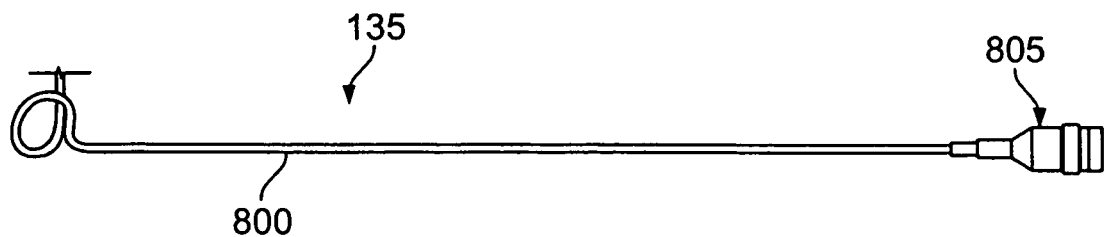
FIG. 9 is a perspective view of an earpiece of the mine detection system of FIG. 1.

Referring also to FIG. 9, the earpiece 135 includes a cable 800 and a connector 805 (such as a circular twist lock connector) that mates with a connector 910 (shown in FIGS. 2 and 10) on the electronics unit 115.

Figure 10:
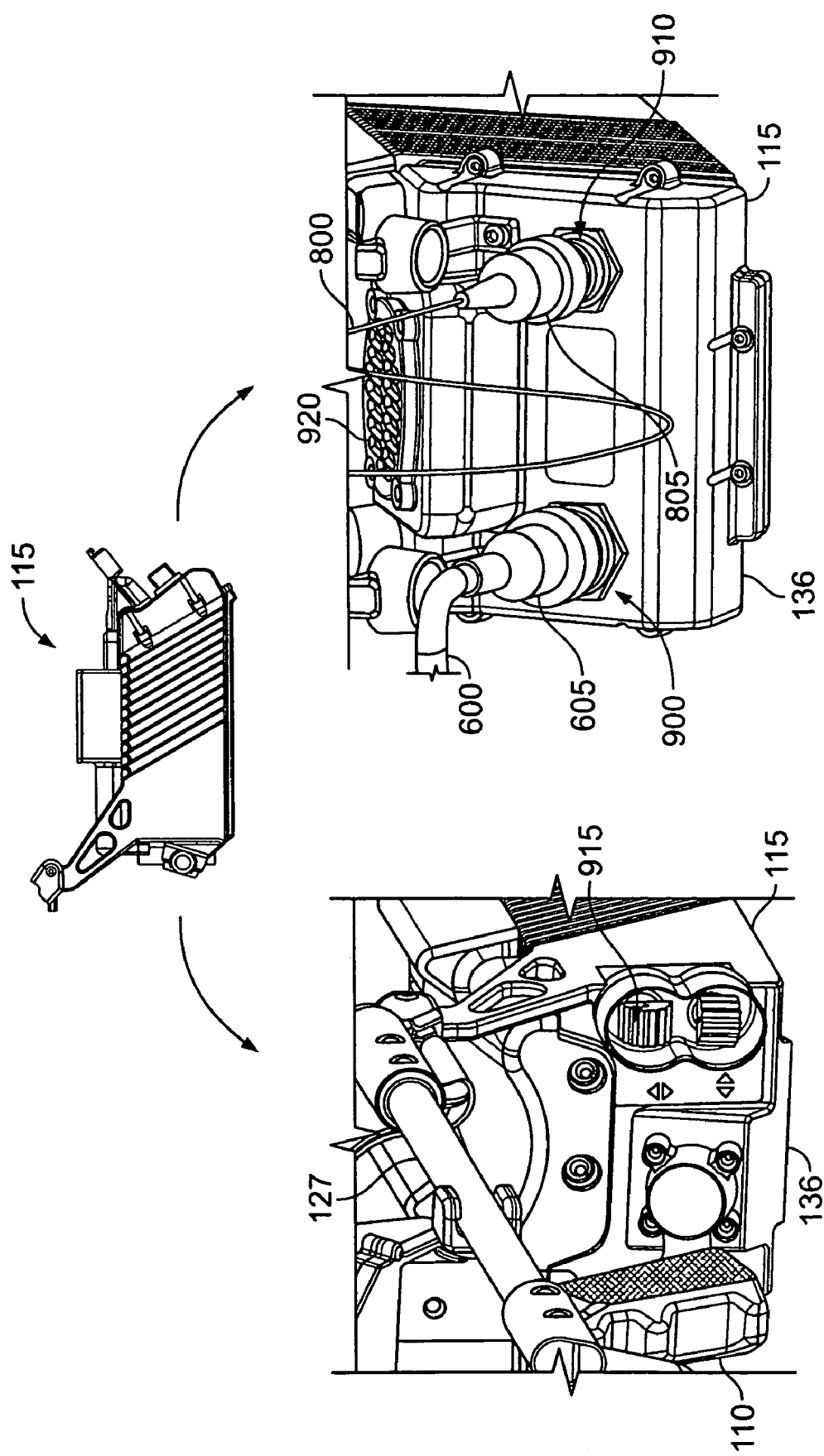
FIG. 10 shows back and front perspective views of an electronics unit of the mine detection system of FIG. 1.

Referring again to FIG. 2 and also to FIG. 10, the electronics unit 115 includes a housing 136, a speaker 137 (FIG. 2) within the housing 136, a set of switches external to the housing 136 that enable a user to control the unit 115, and a set of connectors 900 and 910 on the surface of the housing 136 that couple, respectively, to the connector 605 of the battery pack and the connector 805 of the earpiece 135. The set of switches includes a volume control switch 915. The internal speaker 137 is positioned adjacent one or more openings 920 on a housing 136 to permit audio waves to emanate from the unit 115. The housing 136 can be made of any suitable material, such as, for example, molded plastic.

The housing 136 houses a processor card 220, an interface card 225, electronics 230 of the metal detector, electronics 235 of the radar detector, and a power supply 240.

The power supply 240 is connected to the battery pack 140 through connectors 900 and 605, to the earpiece 135 through connectors 910 and 805, to the interface card 225, and to the radar detector electronics 235. The power supply 240 also connects to the interface controller 110 to enable a user to turn the mine detection system 100 using the power switch 415. The processor card 220 is connected to the interface card 225 and the metal detector electronics 230. The metal detector electronics 230 and the radar detector electronics 235 are controlled by software that is run by their respective processors and that is stored within memory. The software may be modified to support a variety of detection modes and data analysis processes, and to permit improvements to the functionality of the respective electronics 230, 235. The memory can be either internal to the unit 115 or external to the unit 115, such as, for example, through a portable storage device 245 that can be accessed by the electronics 230 and 235 of the unit 115. Both the metal detector electronics 230 and the radar detector electronics 235 are connected to the search device 105, as discussed further below.

Figure 11:
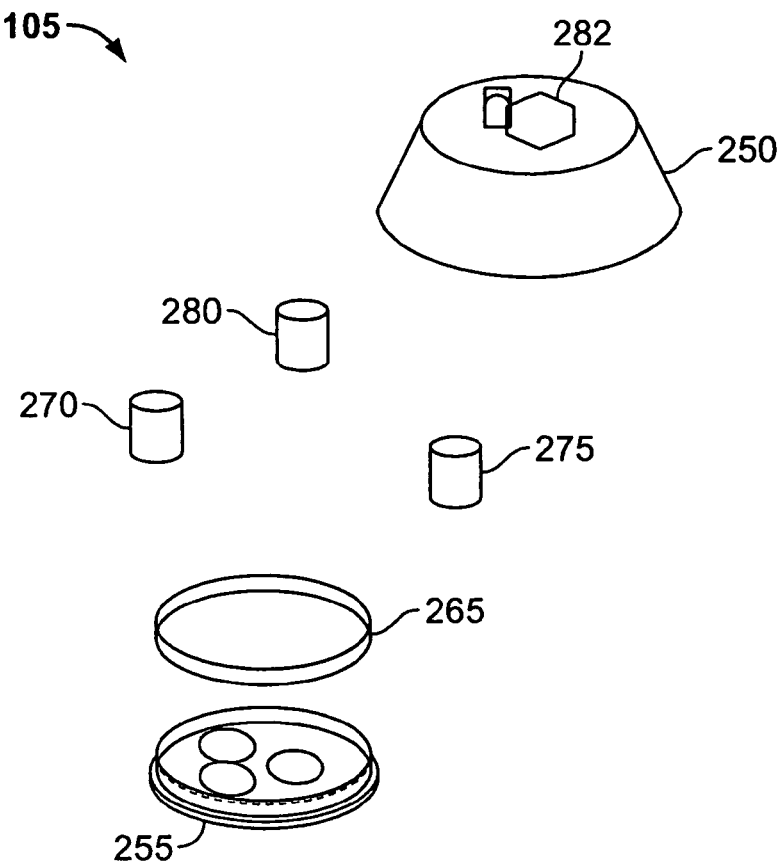
FIG. 11 is an exploded perspective view of a search device of the mine detection system of FIG. 1.
Figure 12:
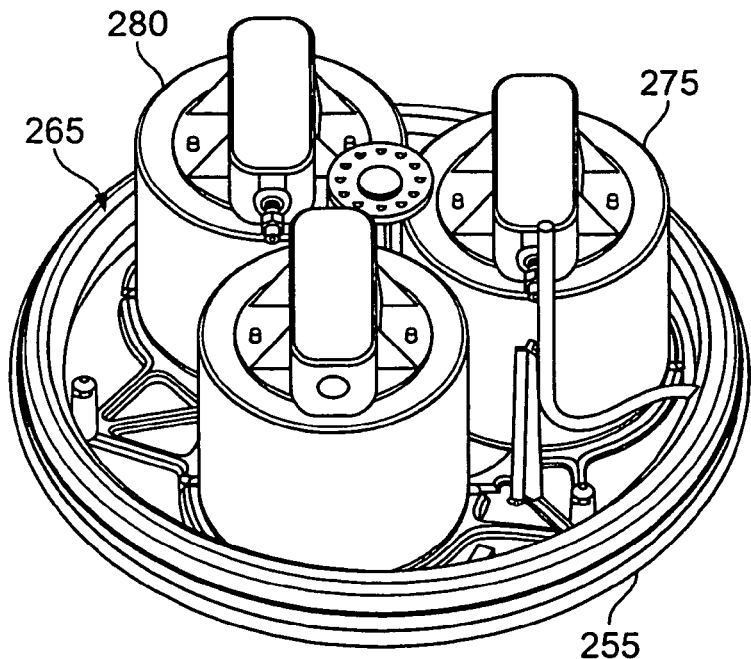
FIG. 12 is a perspective view of the search device of the mine detection system of FIG. 1 without its lid to show internal components.

Referring again to FIG. 2 and also to FIGS. 11 and 12, the search device 105 includes a lid 250 that mates with and connects to a base 255 to form a hollow enclosure. The lid 250 includes an extension piece 260 to which the last segment 200 of the shaft 120 connects. The lid 250 and the base 255 may be formed of any non-magnetic material, such as, for example, molded plastic.

The hollow enclosure of the search device 105 houses the transmitting and receiving components of the metal detector and the radar detector. Thus, the hollow enclosure houses a magnetic field producing device such as a coil 265 that acts as a transmitting/receiving component for the metal detector. Additionally, the hollow enclosure houses a radio wave transmitter such as a transmitting antenna 270, and a radio wave receiver such as a set of receiving antennas 275 and 280. The antenna 270 acts as a transmitting component for the radar detector and the antennas 275 and 280 act as receiving components for the radar detector.

The components of the metal detector and the radar detector within the search device 105 are placed and designed so that operation of one detector does not interfere with the results of the other detector. For example, each of the antennas 270, 275, and 280 can be shielded from external electromagnetic radiation and such that they radiate radiowaves into a narrow path and receive only that electromagnetic radiation from a downward direction that is approximately perpendicular to a bottom surface of the search device 105.

Figure 2:
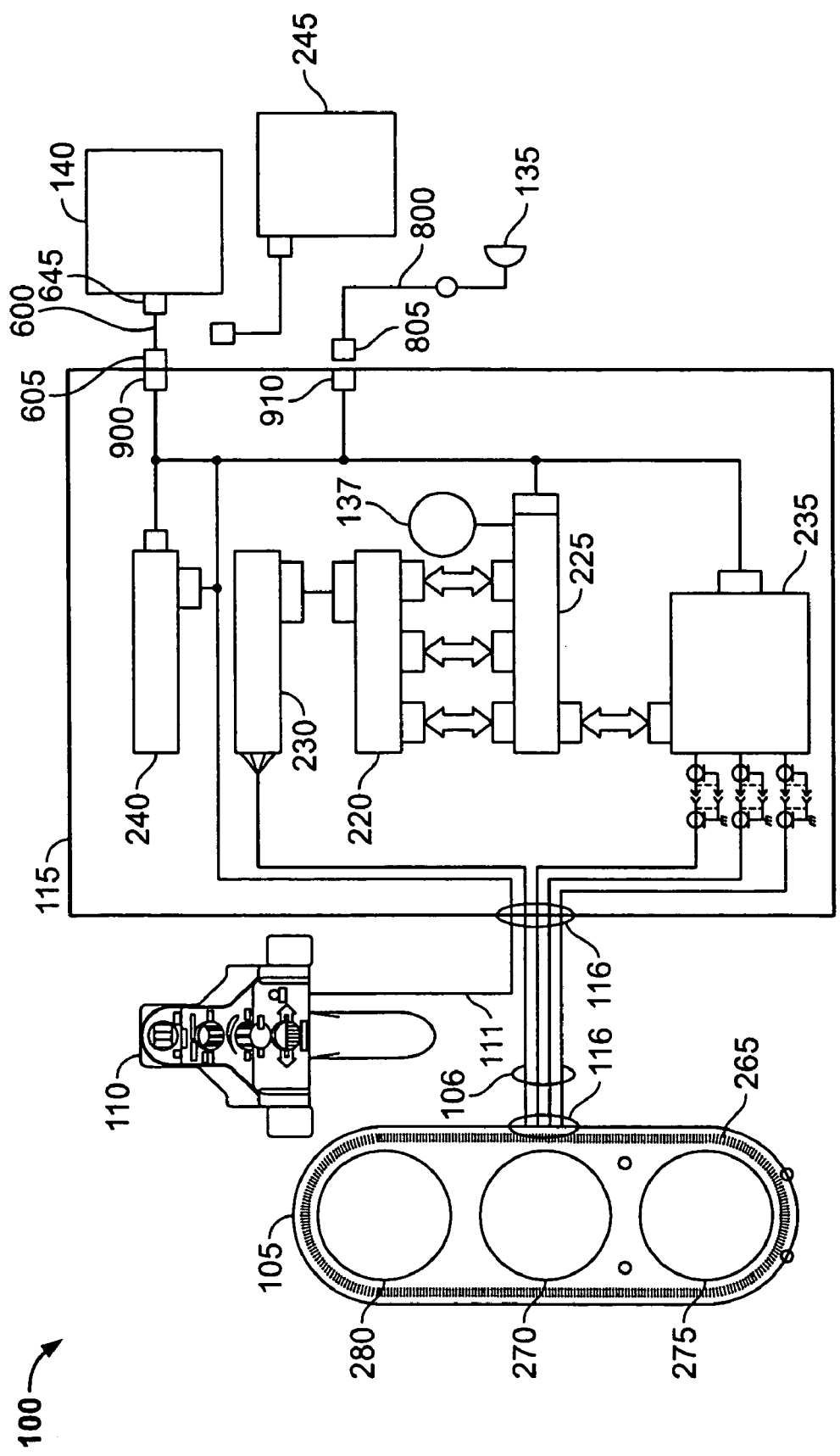
FIG. 2 is a block diagram of the mine detection system of FIG. 1.
Figure 13:
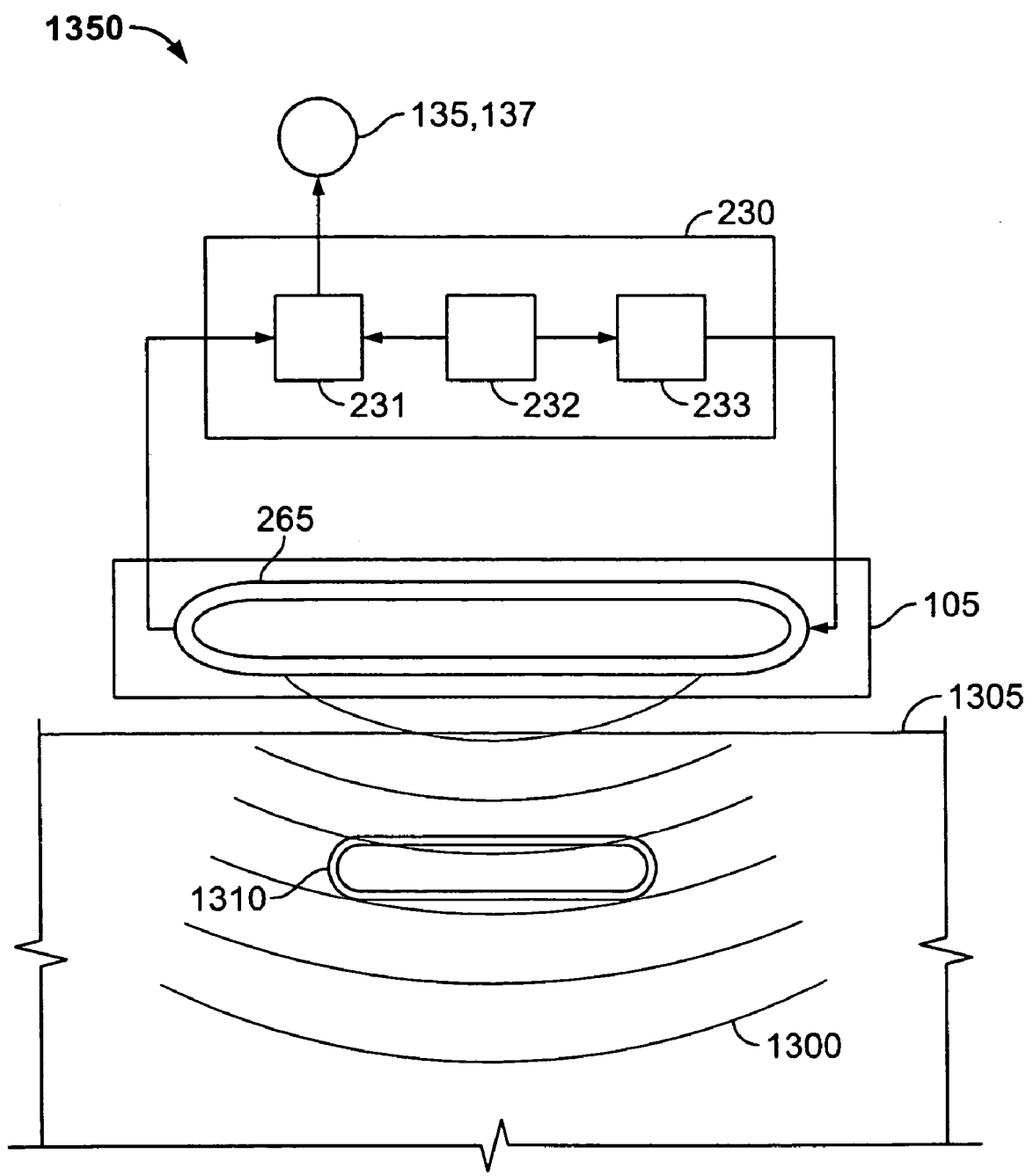
FIG. 13 is a block diagram of the metal detector of the mine detection system of FIG. 1.
Figure 14:
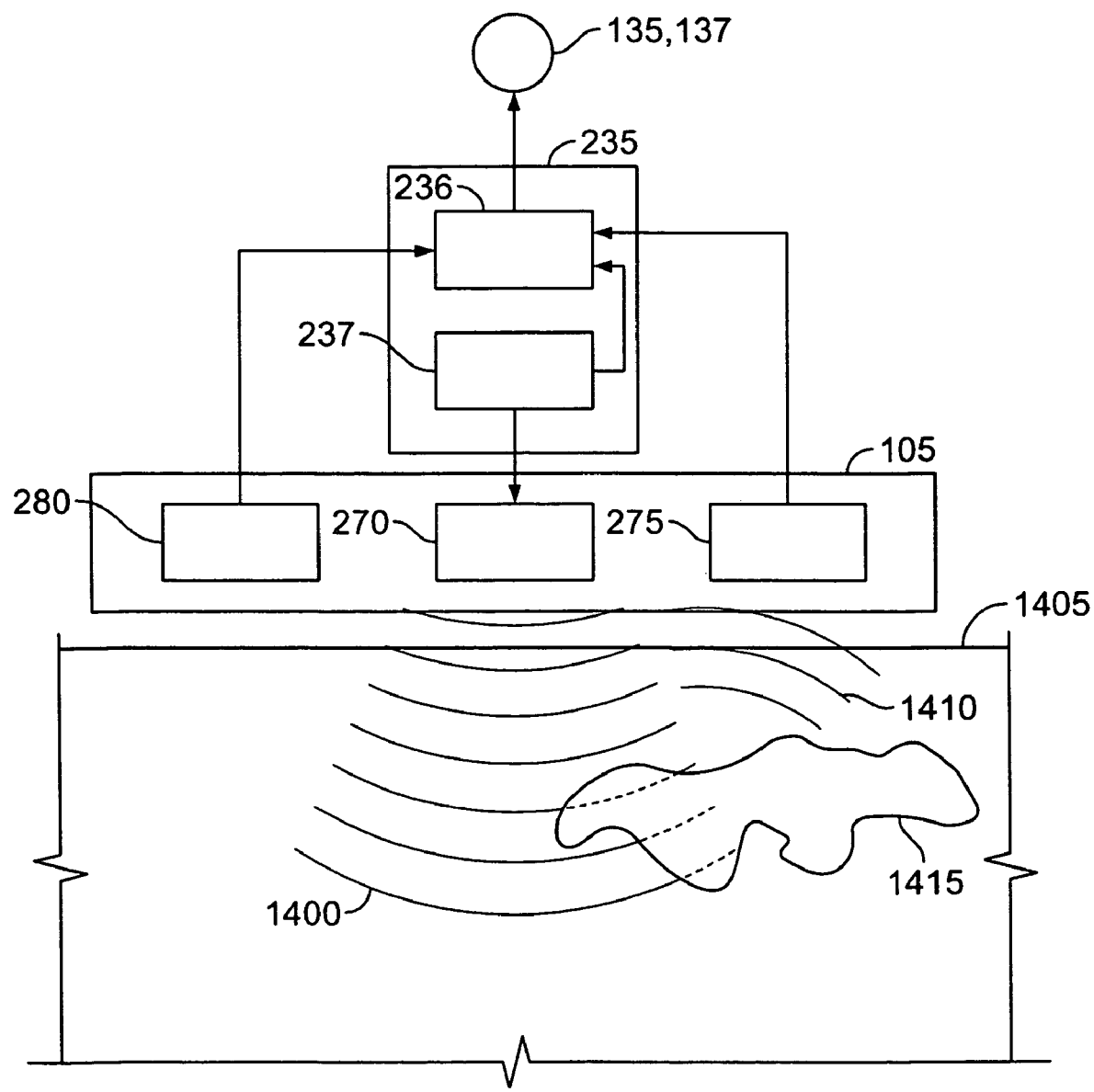
FIG. 14 is a block diagram of the radar detector of the mine detection system of FIG. 1.

Referring to FIG. 13, the metal detector electronics 230 includes a processor 231 that is connected to the coil 265, a pulse generator 232 coupled to the processor 231, and a transmitter 233 that receives electric signals from the pulse generator 232 and transmits the electric signals in the form of an electric current to the coil 265. The processor 231 is also coupled to one or more audio output devices 135, 137 through the interface card 225 (FIG. 2). Referring to FIG. 14, the radar detector electronics 235 includes a processor 236 coupled to the receiving antennas 275 and 280 and a radio frequency generator 237 coupled to the processor 236 and to the transmitting antenna 270. The processor 236 is also coupled to audio output devices 135 and 137 through the interface card 225 or directly (FIG. 2).

Figure 15:
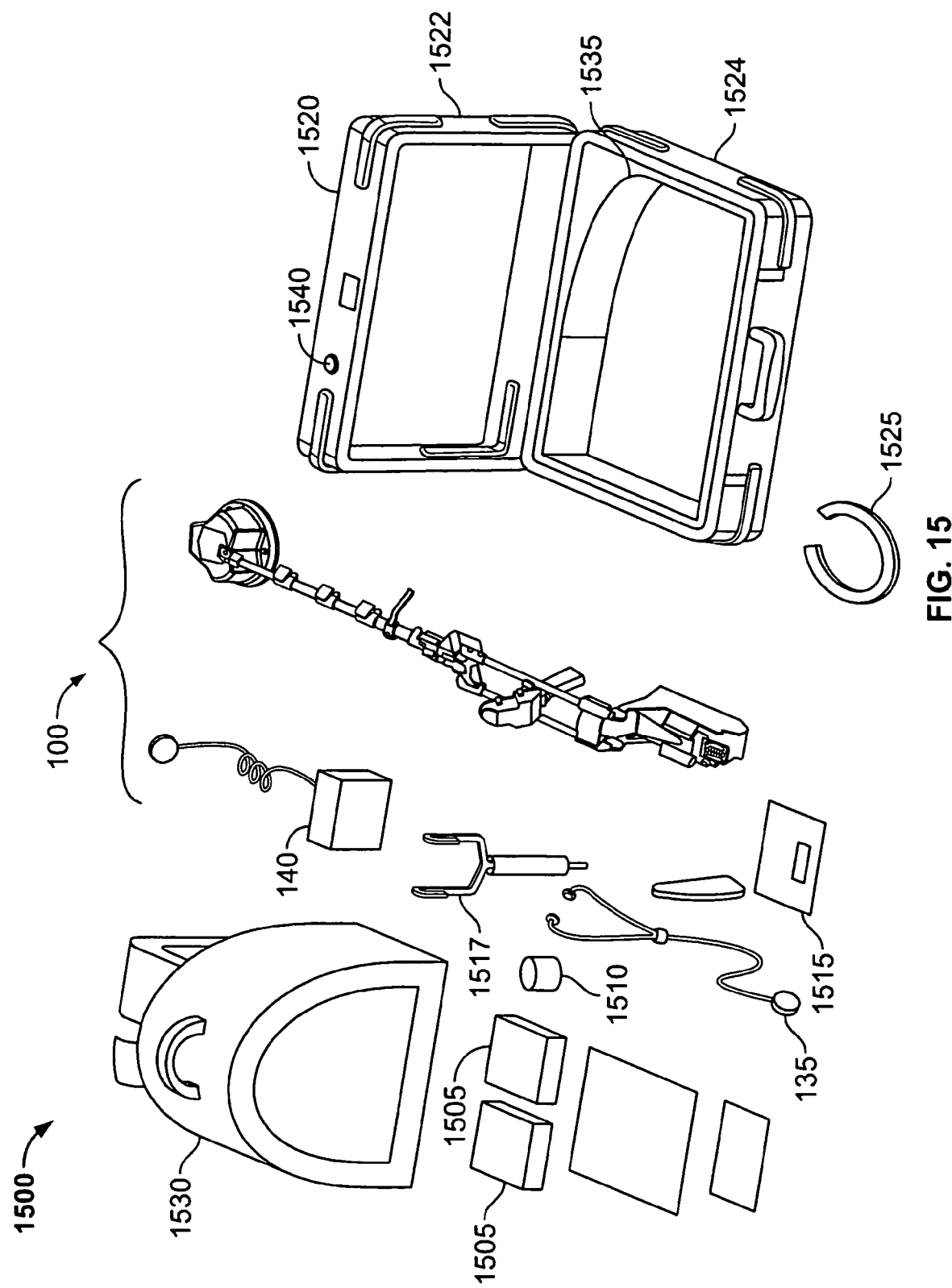
FIG. 15 is a perspective view of a kit for storing and transporting the mine detection system of FIG. 1.

Referring also to FIG. 15, the integrated mine detection system 100 is typically stored and transported in the form of a kit 1500 that includes the system 100, the battery pack 140, and the earpiece 135. The kit 1500 also includes a set of spare batteries 1505, a test piece 1510 that mimics a mine and is used to test the system 100, and a set of training materials that are stored on an external memory device such as a floppy disk 1515 (as shown), a USB memory key, or a CD-ROM. The kit 1500 may include a support sling 1517 that attaches to the interface controller 110 and to clothing worn by a user, such as, for example, a load-bearing vest, to relieve some of the weight of the system 100 during operation.

The kit 1500 includes a storage and transport container 1520, an additional support handle 1525 for carrying the container 1520, and a backpack 1530. The container 1520 is sized to receive the backpack 1530 and includes a lid 1522 and a base 1524. The container 1520 may be lined with cushioning such as foam 1535 to protect the system 100 during storage and transport. Additionally, the container 1520 may be vacuum or air sealed to prevent moisture from entering the system 100 during storage. The seal of the container 1520 is broken by use of an air pressure release valve 1540 on a front of the container 1520.

The backpack 1530 is sized to receive the system 100 in a folded state (shown in FIG. 4), the batteries 1505, the test piece 1510, the floppy disk 1515, and the support sling 1517 (if provided). Thus, during storage in the container 1520, all of the equipment is stored within the backpack 1530, which is then stored in the container 1520. Such a configuration reduces size requirements for storage and transport.

Figure 16:
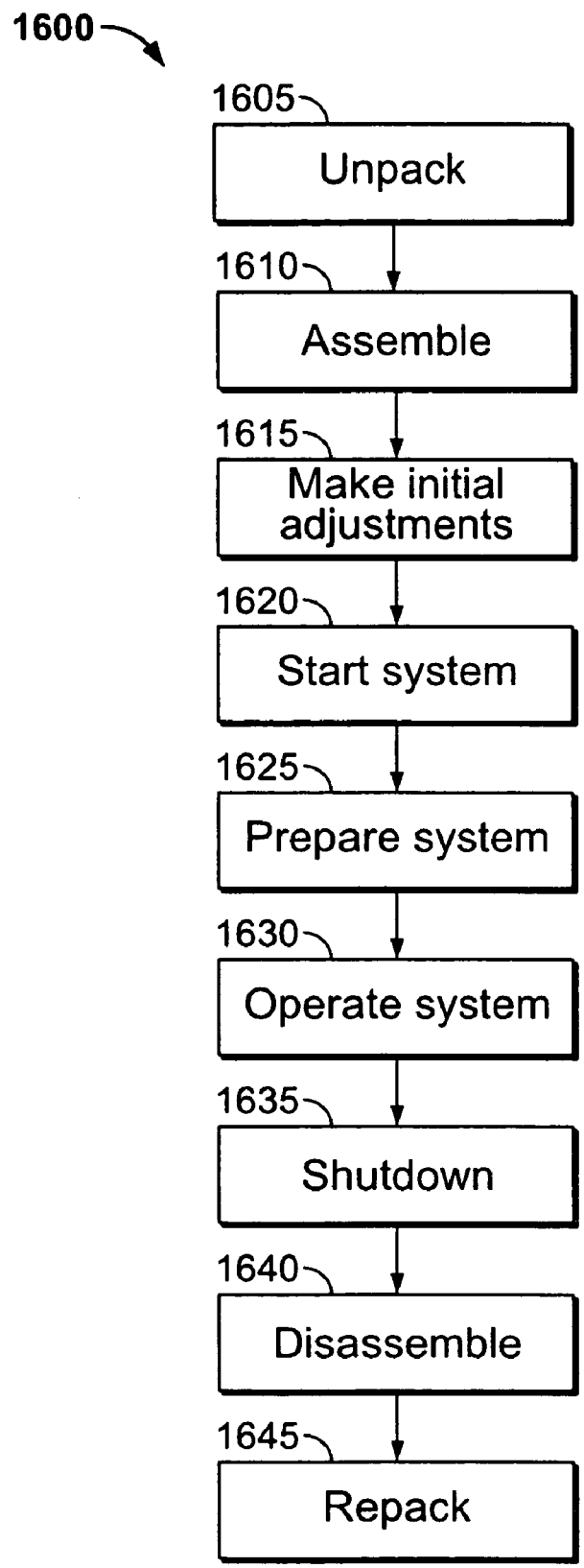
FIG. 16 is a flow chart of a procedure performed by a user for unpacking, preparing, and operating the mine detection system of FIG. 1.

Referring to FIG. 16, a procedure 1600 is performed to use the system 100. Initially, the user unpacks the system 100 from the container 1520 (step 1605) and assembles the system 100 prior to use (step 1610). Initially, during unpacking (step 1605), the user opens the valve 1540 and unlatches the container lid 1522 from the base 1524. Then, the user removes the backpack 1530 from the container 1520 and opens the backpack 1530. The user then removes the system 100 and any other needed equipment from the backpack 1530.

Referring also to FIG. 4, during assembly (step 1610), the user unlatches the yoke 212 from the cradle 127 and unfolds the shaft 120 away from the cradle 127. The user secures the shaft 120 with the latch 215 and unfolds the electronics unit from the cradle 127, as shown in FIG. 3. The user rotates the search device 105 relative to the shaft 120 and the interface controller 110 relative to the cradle 127, as shown in FIG. 1. The user also opens the clamps 205 and expands the segments 200 out to a comfortable position. When the comfortable position is reached, the user closes the clamps 205 to secure the segments 200 and the shaft 120 for use.

Referring also to FIG. 8, the user opens the latches 625, removes the battery pack lid 630 from the case 620, and inserts the battery 615 into the case 620 making sure the battery connector 640 is properly connected to the case connector 645. The user replaces the lid 630 and closes the latches 625. Then, the user connects the battery connector 605 to the electronics unit connector 900, as shown in FIG. 10. If the earpiece 135 is to be used along with the speaker 137, then the user connects the earpiece connector 805 to the electronics unit connecter 910, as shown in FIG. 10. Next, the user inserts her arm through the armrest 125 and grabs the handle 410 of the interface controller 110 (FIGS. 1, 5, and 6). The user can adjust the position of the handle 410 by rotating the handle 410 and by sliding the handle and the controller 110 along the cradle 127. The user can also adjust the tightness of the armrest 125 to her personal comfort.

Once the system is unpacked and assembled (steps 1605 and 1610), the user makes initial adjustments to the system 100 (step 1615). If only the earpiece 135 is to be used during operation (that is, the speaker 137 is not active), then the user should connect the earpiece 135 to the unit 115 during these initial adjustments (step 1615) and prior to startup. If only the speaker 137 is to be used during operation (that is, the earpiece 135 is not active), then the user should not connect the earpiece 135 to the unit 115 during these initial adjustments (step 1615) and prior to startup. If both the earpiece 135 and the speaker 137 are to be used, the user should connect the earpiece 135 after the system 100 is turned on (as discussed below).

After the initial adjustments are made (step 1615), the user starts the system 100 (step 1620). Initially, referring also to FIG. 5, the user sets the radar sensitivity switch 425 to a center position and pushes the power switch 415 momentarily to the on position (for example, to the right).

The user then lets the system 100 warm up for a predetermined time such as five minutes. Next, the user pushes the power switch 415 momentarily to the off position (for example, to the left) to shut down the system 100. Then, the user pushes the power switch 415 momentarily to the on position once again while the search device 105 is resting on the ground. The user then waits until the processor 231 or the processor 236 sends a signal to the audio device 135 or 137 indicating that the system 100 is ready to be trained. The power and function indicator 445 emits a signal (such as a flashing light) after the system 100 has completed startup (step 1620).

After startup (step 1620), the user prepares the system 100 (step 1625) by calibrating the system 100 to the local ground and electromagnetic interference (EMI) conditions and training the system 100, as discussed in detail below with respect to FIG. 17. Once the system 100 is prepared (step 1625), the user can then operate the system (step 1630), as discussed in detail below. When the user is finished operating the system 100 (step 1630), the user shuts down the system 100 by pushing the power switch 415 to the off position (step 1635). After the system 100 is shut down (step 1635), the user disassembles the system 100 (step 1640) and repacks the system 100 (step 1645) in the backpack 1530 and the container 1520 in a reverse order from which the system is assembled and unpacked.

Figure 17:
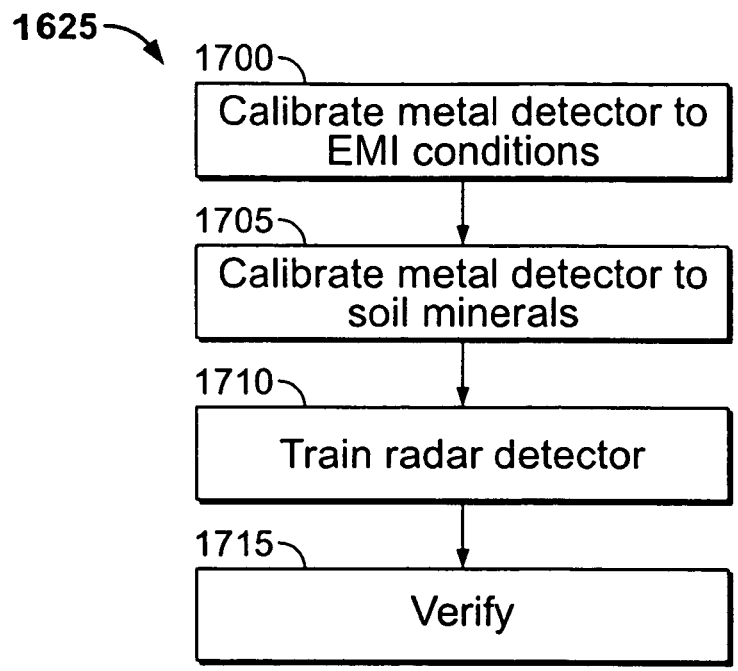
FIG. 17 is a flow chart of a procedure performed by a user for preparing the mine detection system of FIG. 1 for operation.

Referring to FIG. 17, the user performs a procedure 1625 to prepare the system 100. Initially, the user performs a procedure for canceling the effects of EMI conditions on operation of the metal detector (step 1700). During this procedure, the user holds the search device 105 on the ground but not above metal for a predetermined duration (such as 55 seconds). During this duration, the user pushes the metal detection control switch 420 to the left momentarily, and the processor 231 causes the audio device 135 or 137 to continually emit an audio signal such as "noise cancel" indicating to the user that the system 100 is being calibrated to the effects of the EMI conditions. At the end of the duration, the processor 231 causes the audio device 135 or 137 to emit an audio signal such as "noise cancel complete" indicating to the user that the system 100 has been calibrated to the effects of the EMI conditions.

Next, the user performs a procedure for canceling the effects of minerals in the soil on operation of the metal detector (step 1705). Before beginning this procedure, the user ensures that the area is free of all metallic targets. The user then holds the search device 105 a predetermined height (for example, 6-10 inches) above the surface of the ground and pushes and holds the metal detection control switch 420 to the right (FIG. 5). At this time, the processor 231 causes the audio device 135 or 137 to emit a message such as "cal mode" to indicate to the user that the system 100 is being calibrated to the effects of minerals in the soil. The user then maneuvers the search device 105 in an appropriate manner while this calibration is taking place. For example, the user lowers the search device 105 slowly to the ground surface and then returns it to the predetermined height in a smooth, continuous motion for about four seconds. Or, the user moves the search device 105 up and down relative to the ground surface for a predetermined time period. When the user finishes maneuvering the search device 105, the user releases the metal detection control switch 420 and listens for an audio signal emitted from the device 135 or 137 indicating that calibration is complete. For example, the processor 231 may send a "cal mode complete" signal to the audio device 135 or 137 after the user releases the control switch 420.

Moreover, the user may perform this procedure (step 1705) at any time if the user determines that background audio levels have increased or decreased during normal operation as long as there is no mineralized soil or metal in the region.

Next, the user trains the radar detector electronics 235 (step 1710) over ground that is similar to the area to be searched. Training sets a baseline for the mine detection system 100 to compare future readings. Furthermore, the system 100 is retrained when the ground to be swept is drastically different from the ground on which the system 100 was trained. In this case, the system 100 is first shut down completely (step 1635) and then restarted (step 1620). To train, the user pushes and holds the trigger switch 435 (FIG. 6) on the interface controller 110. Then, the user performs a normal sweep pattern over the ground in front of the user, advancing about ⅓ of the diameter of the search device 105 after each swing while keeping the search device 105 below a predetermined height (for example, 2 inches) from the ground. The user can then cover about 3-6 feet of ground in a forward direction during the normal sweep pattern. The user performs the normal sweep pattern while the processor 236 sends a signal to the audio device 135 or 137 to emit a "training" sound. The user releases the trigger switch 435 when the user hears the sound "training complete" from the audio device 135 or 137. The training takes about 45 seconds and at the end of the training, the processor 236 sends a signal to the audio device 135 or 137 to emit a sound (for example, "localize") indicating that the user can begin normal operation of the system 100.

Generally, during start up (step 1620), the user can set the radar sensitivity switch 425 to an up position. The user can adjust the radar sensitivity by moving the switch 425 to accommodate for the user's sweeping technique or a particular terrain.

After training (step 1710), the user then verifies that the system 100 is ready to be operated (step 1715). During verification, the user releases the trigger switch 435, places the test piece 1510 on the ground, passes the search device 105 over the test piece 1510, and verifies proper operation of the metal detector and the radar detector by listening for audio signals from the devices 135 or 137. If either or both of the audio signals are not heard, then the user must shut down the system 100 (step 1635) and repeat startup (step 1620) and preparation (step 1625).

After the system has been prepared (step 1625), the user can operate the system 100 during normal operation (step 1630). During normal operation, the user pushes the trigger switch 435 (FIG. 6) on the interface controller 110 and performs a sweep technique, which is detailed below. During this time, the metal detector (made up of the electronics 230 and the coil 265) and the radar detector (made up of the electronics 235 and the antennas 270, 275, and 280) operate independently and simultaneously to detect mines in the vicinity of the sweep. Both detectors transmit and receive data and automatically and continuously update the audio signal sent to the device 135 or 137 to notify the user of any changes in detection that might indicate the presence of a mine. As discussed above, the two detectors are operationally compatible with each other such that they do not interfere with each other during simultaneous operation.

Figure 18:
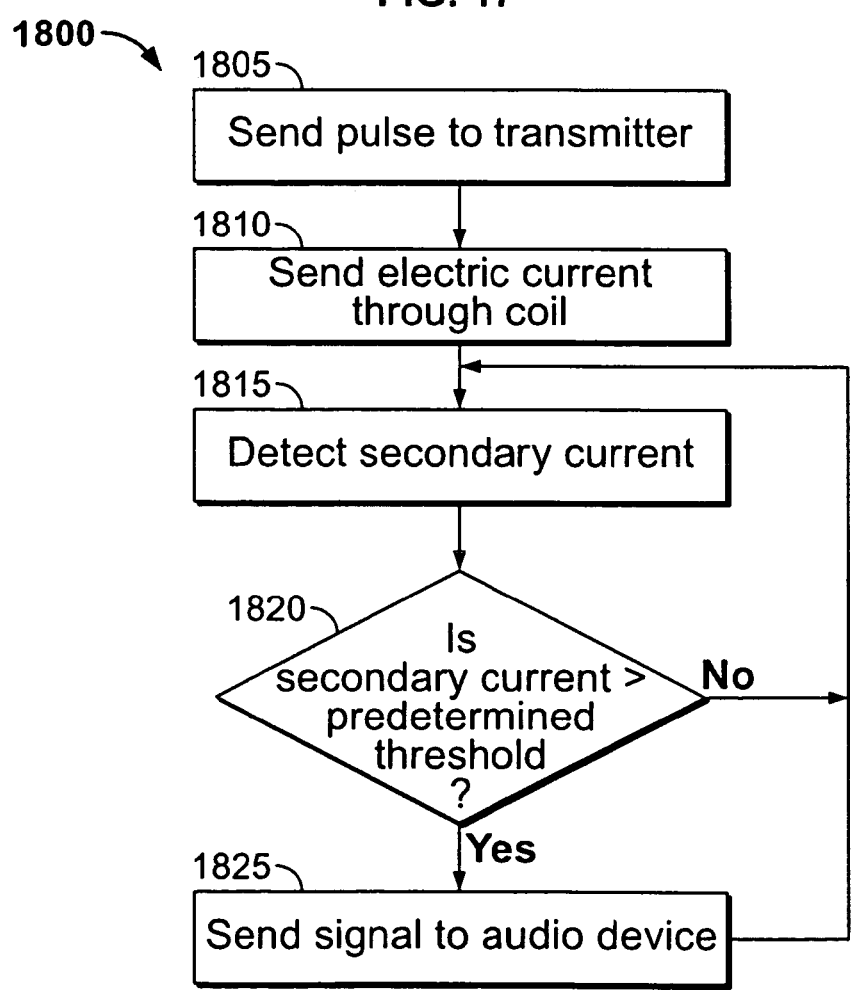
FIG. 18 is a procedure performed by the metal detector of the mine detection system of FIG. 1 for detecting a presence of a mine.

Referring to FIG. 18 and again to FIGS. 2 and 13, the metal detector electronics 230 perform a procedure 1800 during a sweeping operation (either during preparation at step 1625 or during normal operation at step 1630). Initially, the pulse generator 232 sends pulses to the transmitter 233 (step 1805), which transmits electric current to the coil 265 (step 1810). The electric current through the coil 265 induces a magnetic field 1300 that emanates from the coil 265 and into the ground 1305. When the magnetic field strikes a metal object 1310, it induces a secondary magnetic field in the metal object 1310. The secondary magnetic field of the metal object 1310 induces a secondary current in the coil 265. The processor 231 monitors the current from the coil 265 and detects the secondary current by detecting a change in the electric current through the coil 265 from the transmitter 233 (step 1815). If the processor 231 determines that the secondary current is greater than a predetermined threshold (step 1820), then the processor sends an audio signal to the device 135 or 137 to indicate to the user that metal is present under the ground 1305 (step 1825).

Figure 19:
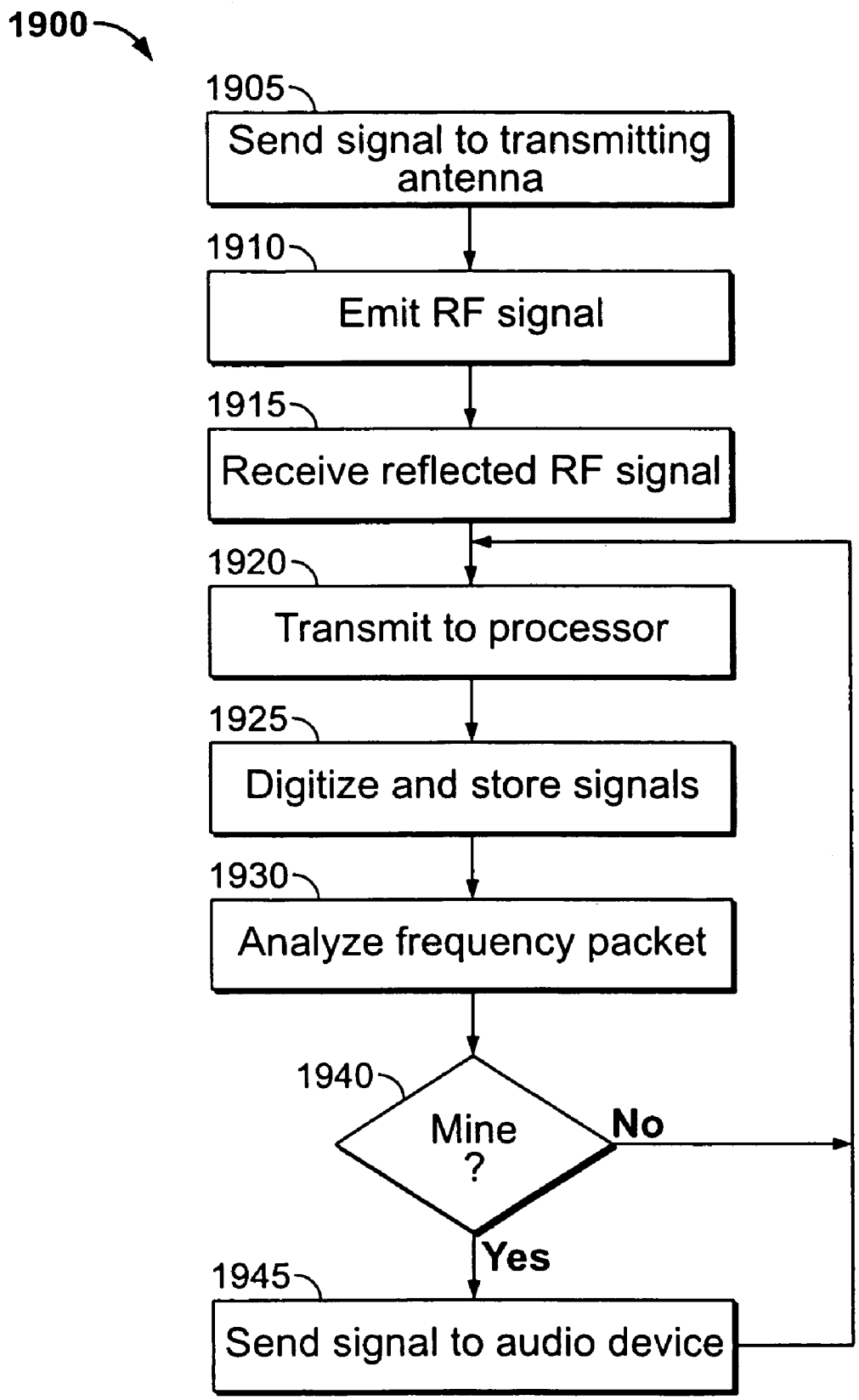
FIG. 19 is a flow chart of a procedure performed by the radar detector of the mine detection system of FIG. 1 for detecting a presence of a mine.

Referring to FIG. 19 and again to FIG. 14, the radar detector electronics 235 perform a procedure 1900 during a sweeping operation (either during preparation at step 1625 or during normal operation at step 1630). The radio frequency generator 237 continuously sends a radio frequency (RF) signal of sufficient strength or power for the radar sensitivity desired (as determined by the configuration of the radar sensitivity switch 425) to the transmitting antenna 270 (step 1905). The transmitting antenna 270 emits the RF signal 1400 into the ground 1405 (step 1910). Either or both of the receiving antennas 275 and 280 collect any RF signals 1410 that have been reflected by an underground feature 1415 and that reach the antenna 275 or 280 (step 1915). During this process, the generator 237 steps the RF signal between a start frequency and a stop frequency in equal increments. For each frequency step, the RF signals reflected from the underground feature 1415 are received by the antenna 275 or 280, which transmits the RF signals to the processor 236 (step 1920), which then digitizes and stores the signals (step 1925). The processor 236 collects the data for all steps between the start and stop frequencies and the data collection is referred to as a "frequency packet." The processor 236 analyzes the frequency packet (step 1930) to determine if a mine is underground (step 1940). If the processor 236 determines that a mine is underground, the processor 236 sends a signal to the audio device 135 or 137 indicating the presence of the mine (step 1945). If the processor 236 determines that a mine is not underground (step 1940), then the processor 236 simply awaits the next transmission from the antenna 275 or 280 (step 1920).

As mentioned above, the user "sweeps" the mine detection system 100 to detect mines, with the quality of the mine detection results being directly related to the quality of the user's sweep technique. The important components to a proper sweep technique are the user's stance, the position of the search device 105, the speed at which the user sweeps the search device 105, and the coverage of the sweep (called a lane).

First, the user stands in a comfortable and balanced position that permits the user to cover a full lane width without having to change position.

Figure 20:
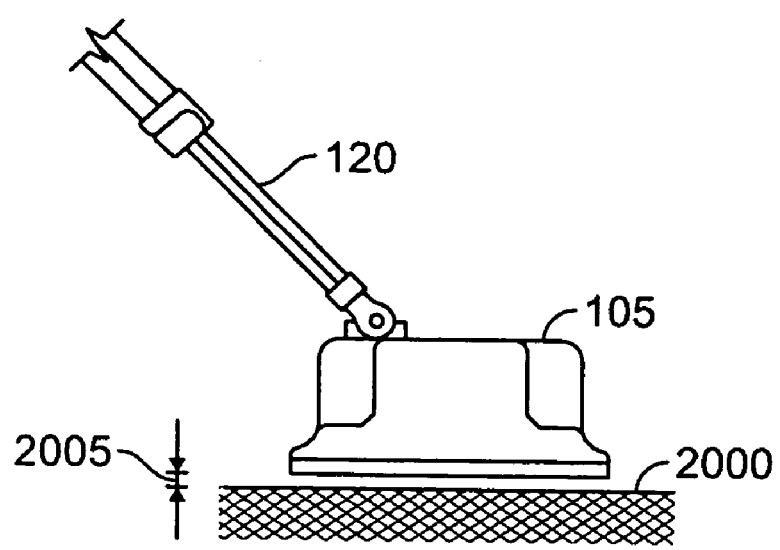
FIGS. 20 and 21 are side views of the search device of the mine detection system of FIG. 1.

Second, referring to FIG. 20, the search device 105 is positioned parallel to and as close to the ground 2000 as possible but not more than a predetermined height 2005 above the ground. In one implementation, the predetermined height 2005 is 2 inches. Moreover, before beginning a sweep, the user adjusts the relative angle between the search device 105 and the shaft 120 to ensure that the search device 105 is parallel to the ground during a sweep.

Third, the user sweeps the search device 105 across the ground within a predetermined sweep speed. In one implementation, the sweep speed is between about 1 to 3.6 feet/second across a five-foot lane.

Figure 21:
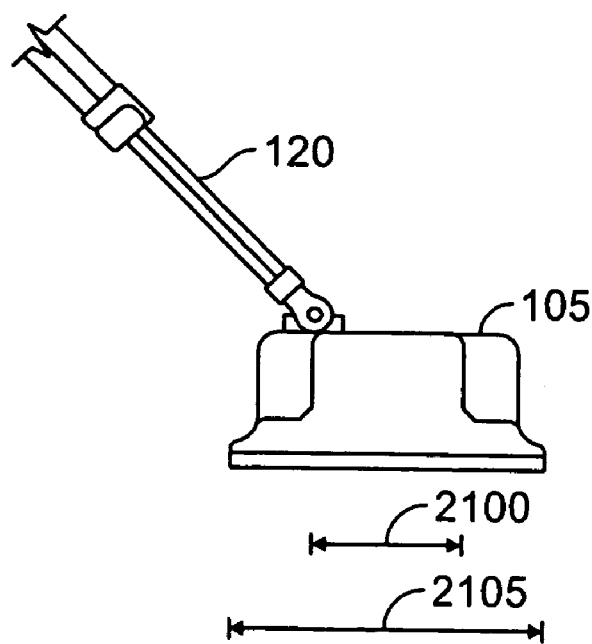

Fourth, the user moves the search device 105 across a lane in as straight a line as possible, while trying not to pull the search device 105 back toward the user's body or rock the device 105 near the edge of the lane. Referring also to FIG. 21, the actual search width 2100 of the radar detector does not extend to the edges of the search device 105. In practice, the search width for the radar detector extends to the locations of the antennas 270, 275, and 280 and is indicated on a top of the search device 105 by a different colored marking, called a sweet spot 282 (FIGS. 1 and 11). The search width 2105 of the metal detector is approximately equal to the diameter of the coil 265. Because the search width 2100 for the radar detector is about ⅓ of the diameter of the search device 105, the search device 105 should be moved forward no more than about ⅓ of the diameter of the search device 105 between sweeps.

Figure 22:
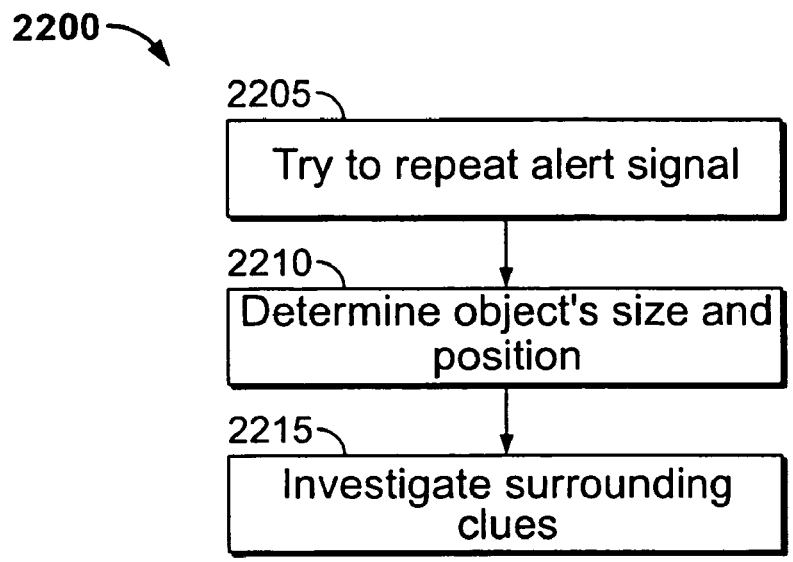
FIG. 22 is a flow chart of a procedure performed by a user of the mine detection system of FIG. 1 after receiving an alert signal.

If the user passes the search device 105 over a suspected buried mine or debris, the processor 231 of the metal detector sends a tone to the audio device 135 or 137 or the processor 236 of the radar detector sends a beep to the audio device 135 or 137. In this way, the user can distinguish between the results from the radar detector and the results from the metal detector. After the user hears the tone or the beep, the user then investigates the suspected mine further according to a procedure 2200 as shown in FIG. 22. To investigate the suspected mine, the user typically first tries to repeat the alert signal (that is, the beep or the tone) (step 2205). To do this, the user repeats the sweep several times at different angles over the same area while adjusting sensitivity higher or lower if necessary. If the new sweep does not repeat the alert signal then the user can continue sweeping the lane. Next, once the alert signal has been repeated, the user can then proceed to determine the object's size and position (step 2210). Meanwhile, the user also investigates surrounding clues (step 2215) to make an overall determination of the location of a mine.

Figure 23A:
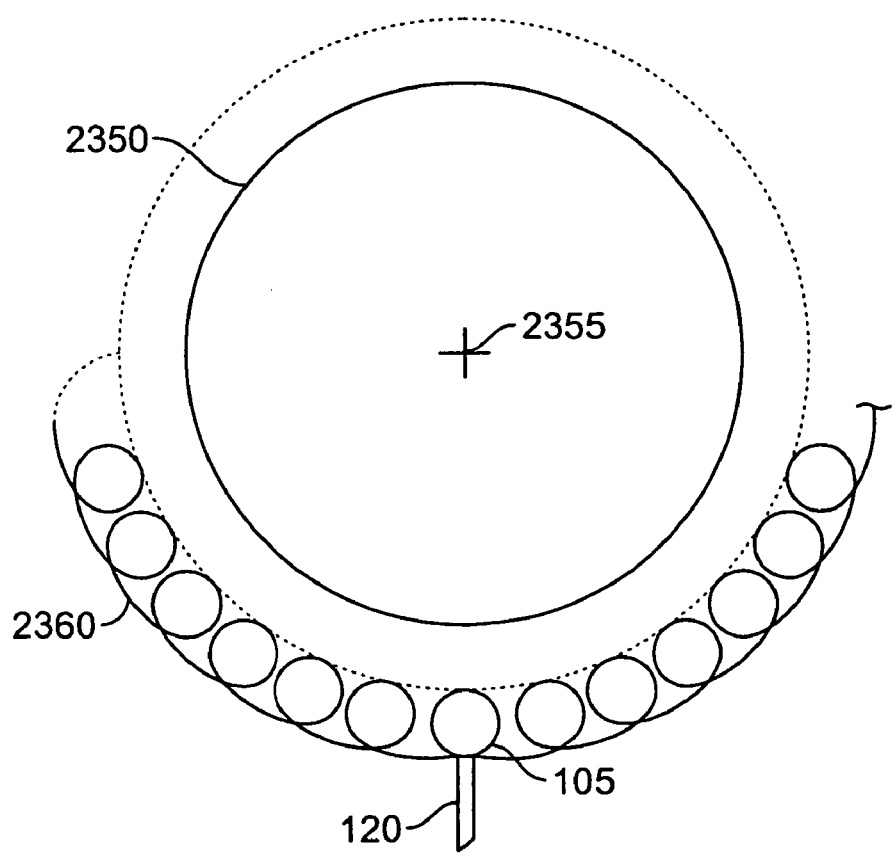
FIG. 23A shows an overhead view of a sweep pattern performed by a user of the metal detector of the mine detection system of FIG. 1.
Figure 23B:
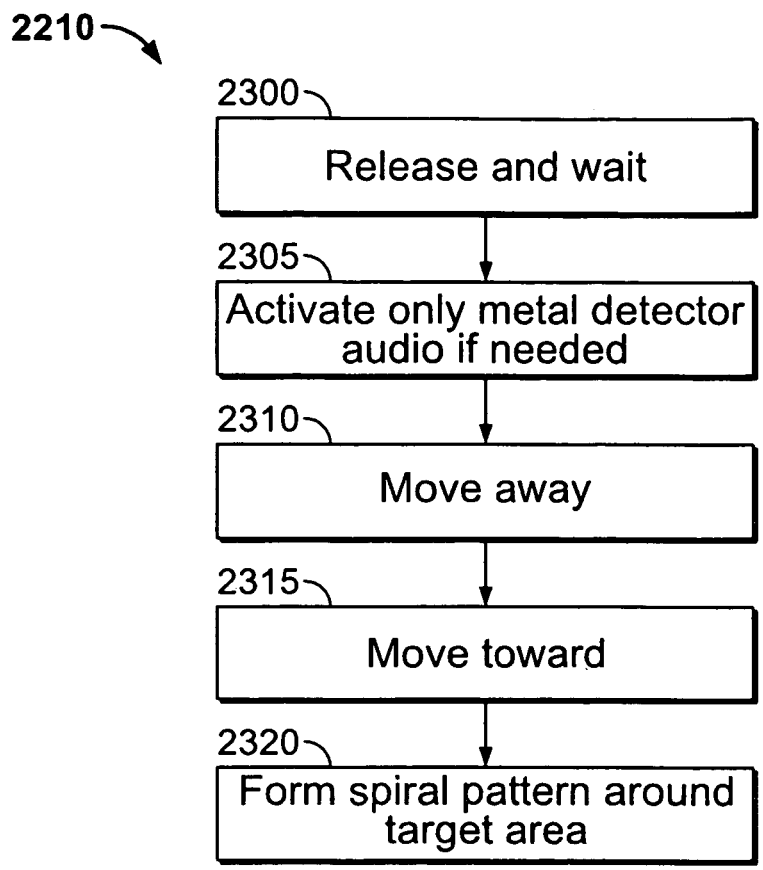
FIG. 23B is a flow chart of a procedure performed by the user during the sweep pattern of FIG. 23A.

Referring also to FIGS. 23A and 23B, in determining the object's size and position at step 2210, the user performs a procedure 2210 if using the metal detector to investigate. First, the user releases the trigger switch 435 and waits for an audio ready signal such as "localize" (step 2300). If needed, the user then moves the audio control switch 430 to the right to activate the metal detector only (step 2305). Next, the user moves the search device 105 back from the suspected mine area 2350 until the audio sound for the metal detector diminishes (step 2310) and then moves the search device 105 toward the center 2355 of the suspected mine area 2350 until the audio sound for the metal detector is heard or increases (step 2315). The user moves the search device 105 back and forth and in and out such that the search device 105 spirals around the target area (step 2320), thus forming a spiral pattern 2360.

Figure 24A:
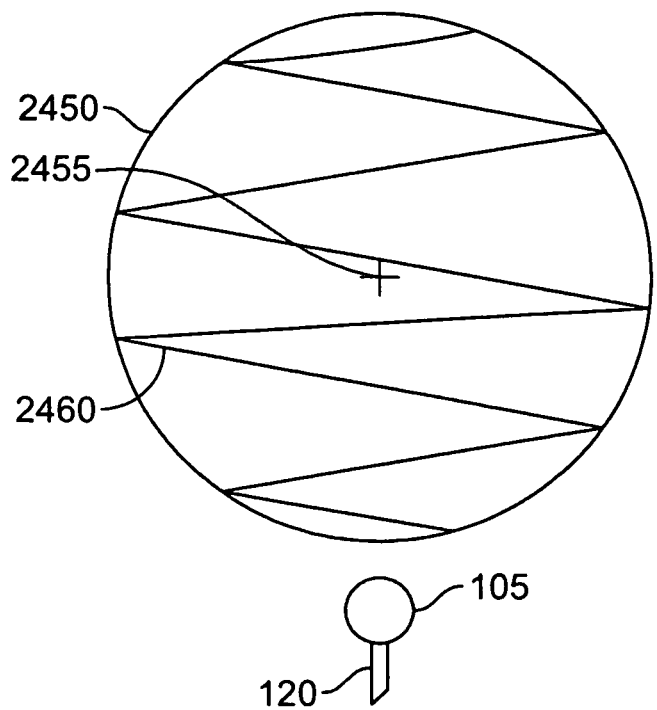
FIGS. 24A and 24C show overhead views of sweep patterns performed by a user of the radar detector of the mine detection system of FIG. 1.
Figure 24B:
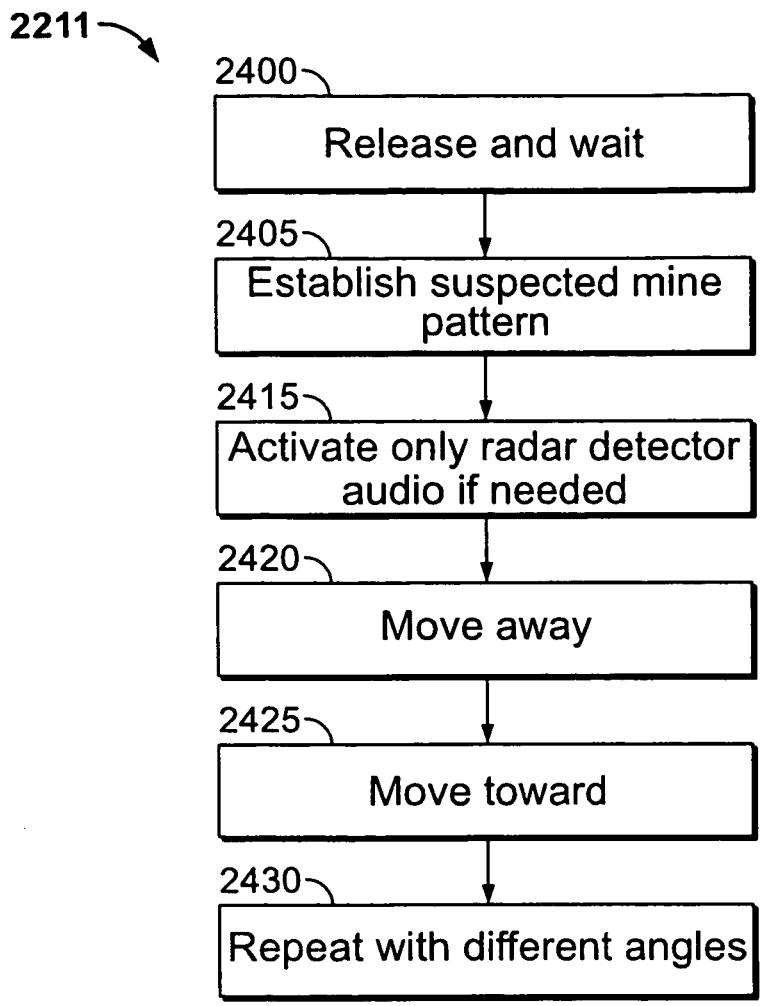
FIG. 24B is a flow chart of a procedure performed by the user during the sweep pattern of FIGS. 24A and C.
Figure 24C:
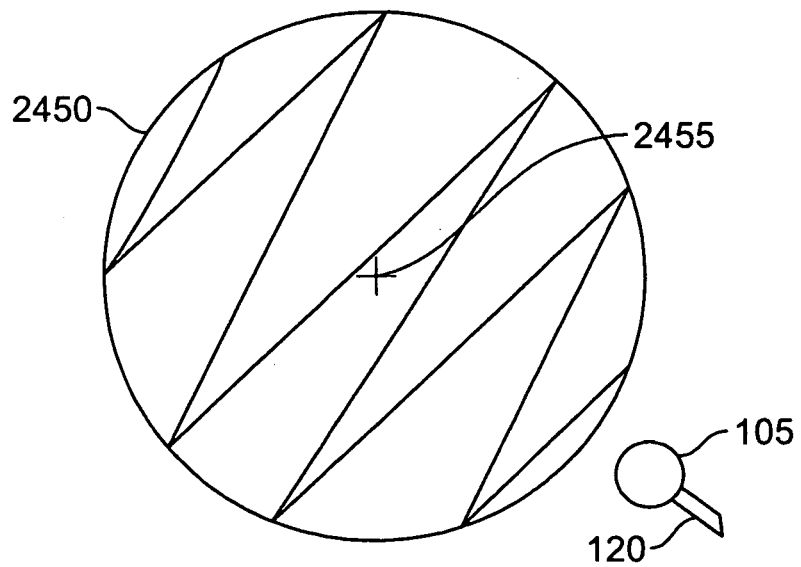

Referring also to FIGS. 24A and 24B, in determining the object's size and position at step 2210, the user performs a procedure 2211 if using the radar detector to investigate. First, the user releases the trigger switch 435 and waits for an audio ready signal such as "localize" (step 2400). Then, the user establishes the suspected mine pattern using the procedure 2210 detailed in FIG. 23B (step 2405). If needed, the user then moves the audio control switch 430 to the left to activate the radar detector only (step 2415). Next, the user moves the search device 105 back from the suspected mine area 2450 until the audio sound for the radar detector stops (step 2420). Then, the user moves the search device 105 in short sweeps within the suspected mine area 2450 and around the approximate center of the mine 2355 until the audio sound for the radar detector is heard (step 2425). The user continues the short forward sweeps through the suspected mine area 2450 while the radar detector alerts are activating, thus forming a zigzag pattern 2460. The user then repeats the zigzag pattern from several different approach angles (one alternate zigzag pattern 2465 is shown in FIG. 24C) to verify the results of the suspected mine location (step 2430).

The user can also use characteristics of known mines to evaluate the results of the investigation. For example, an anti-tank, metallic mine (AT-M) shows a metal detector footprint of a semi-circular halo of about 20-26 inches from the mine center when buried at a depth of 5 inches and a radar detector footprint of an outside edge of about 13 inches in diameter.

Other implementations are within the scope of the following claims. For example, the audio signals sent to the audio device 135 or 137 may be sounds other than beeps or tones.

Figure 25A:
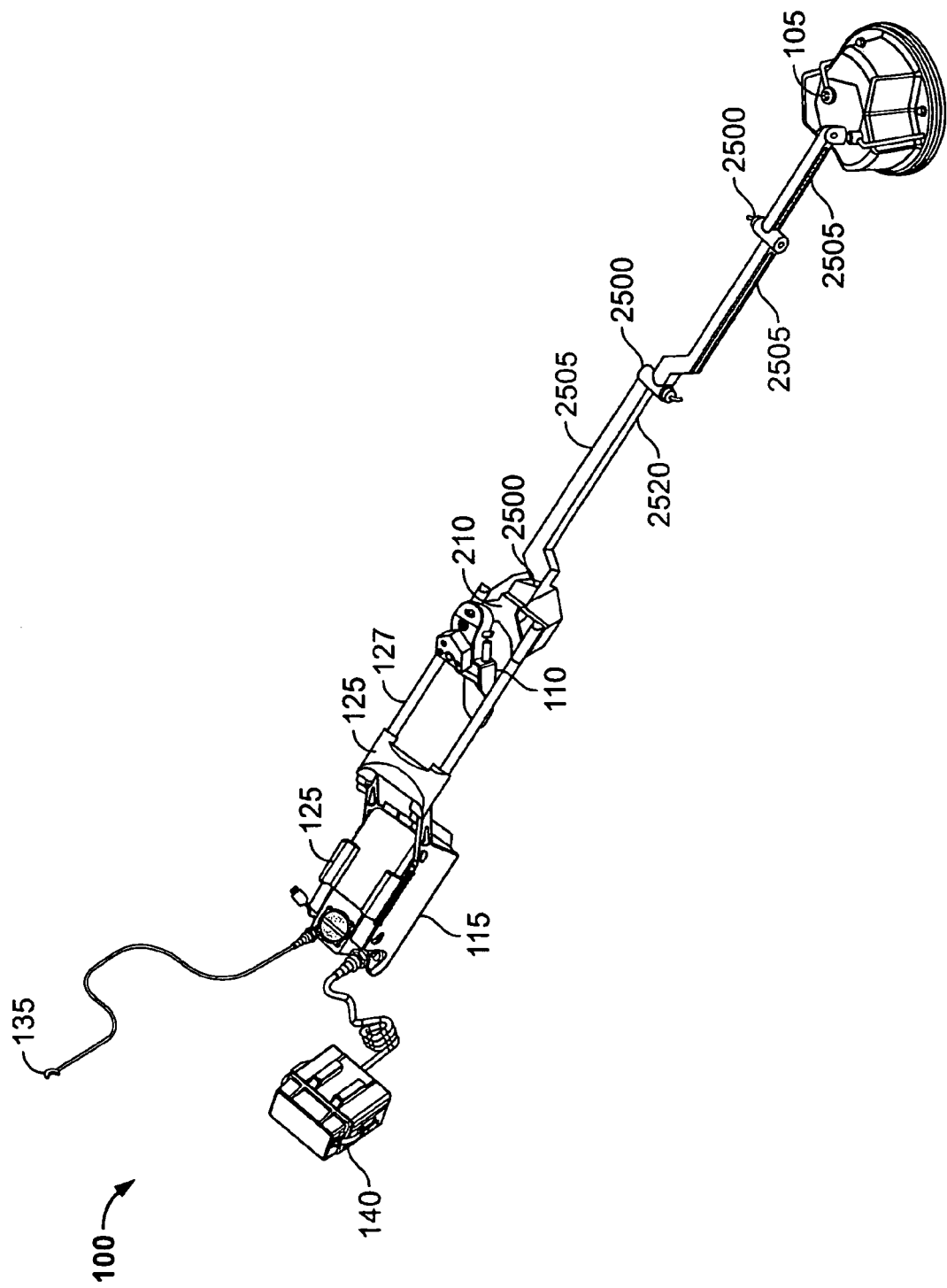
FIGS. 25A and 25B show another implementation of the mine detection system of FIG. 1.
Figure 25B:
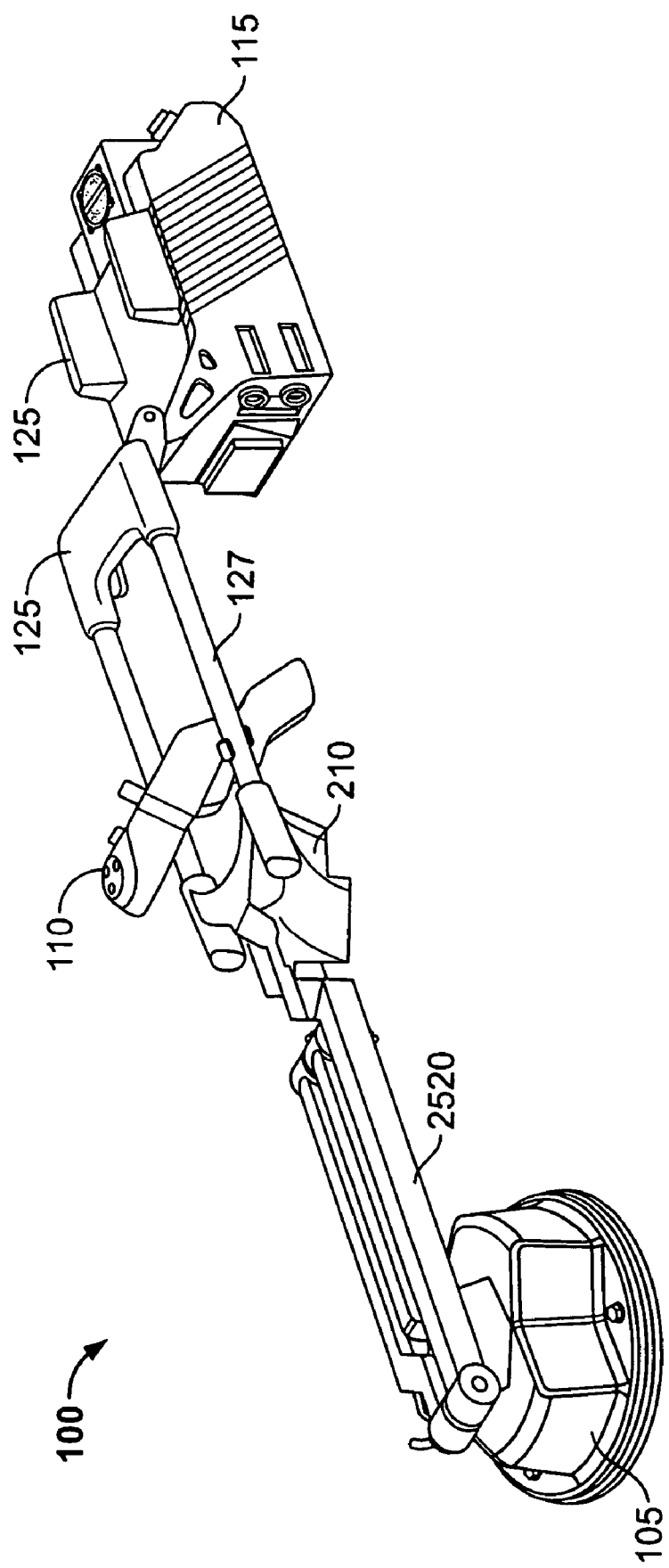

Referring also to FIGS. 25A and 25B, in another implementation, instead of the telescoping shaft 120, the shaft 2520 is articulated at joints 2500 to form segments 2505. Thus, each segment 2505 can be folded over to reduce the length for storage and transportation (as shown in FIG. 25B).

The mine detection system 100 may include infrared detection integrated with the radar and the metal detection. The radar detector may include more than one transmitting antenna and more than two receiving antennas.

In the procedure discussed above, the metal detector (made up of the electronics 230 and the coil 265) and the radar detector (made up of the electronics 235 and the antennas 270, 275, and 280) operate independently and simultaneously to detect mines in the vicinity of the sweep. Thus, each detector includes its own processor. However, in another implementation, a single processor can be used to control both the metal detector and the radar detector. The processor can run a single algorithm for analyzing the results and notifying the user of any changes in detection that might indicate the presence of a mine.

Figure 26:
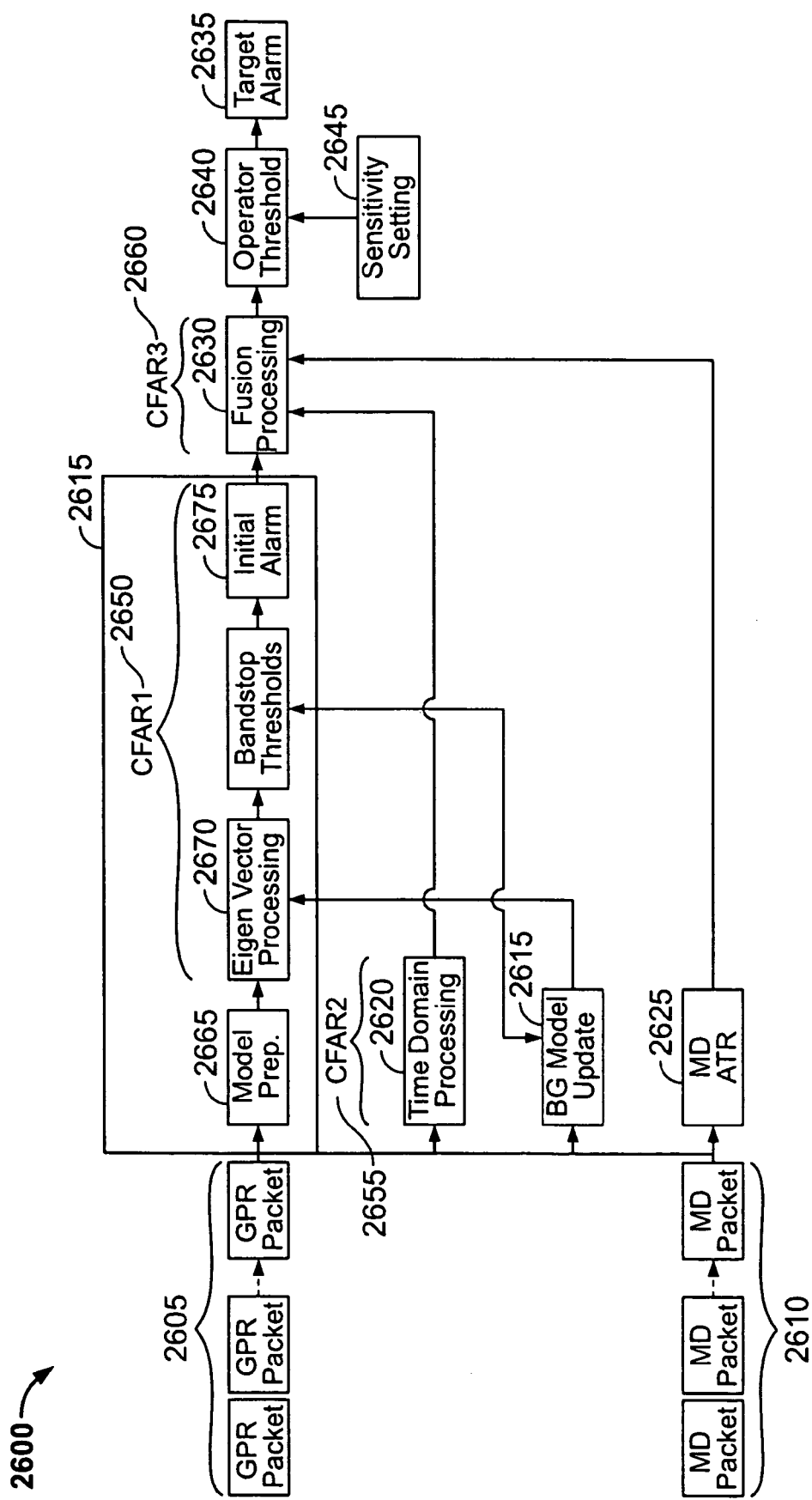
FIGS. 26-28 are flow charts of procedures performed by a processor of the radar detector within the mine detection system of FIG. 1.

In one implementation, the processor 236 analyzes the data (that are in the form of packets) from the transmitting and receiving components of both the radar detector and the metal detector to determine if a mine is underground at step 1940. Referring to FIG. 26, in this implementation, the processor 236 uses a procedure 2600 that begins by receiving the data packet from the radar detector receiving component (for example, the antennas 275 and 280) (step 2605) and receiving the data packet from the metal detector that came from its receiving component, that is, the coil 265 (step 2610).

The processor 236 analyzes a model of radar detector response to current ground conditions using a principal component analysis to describe clutter features, as detailed below (step 2615). The processor 236 also transforms the radar data from the frequency domain to the time domain in order to analyze the depth of the anomaly (step 2620). The processor 236 receives results from the analysis of the metal detector (step 2625) and uses these results later to eliminate clutter noise and localize alarms from the radar detector.

Next, the processor 236 compares the results of the model analysis from step 2615, the depth analysis from step 2620, and the metal detector analysis from step 2625 (step 2630) to make a determination of whether an alert signal should be sent to the audio device 135 or 137 (step 2635) based on a signal threshold 2640 that depends, at least in part, on the sensitivity setting 2645 from the radar sensitivity switch 425.

Additionally, at various stages (for example, steps 2650, 2655, and 2660) during the procedure 2600, the processor 236 adjusts the signal threshold 2640 to maintain a constant false alarm rate (CFAR). Often, the alarm rate can rapidly rise or drop with abrupt changes in background statistics due to changing ground conditions. Thus, the processor 236 dampens the effects of the changing ground conditions by recognizing a rapid change in background statistics and adjusting the signal threshold 2640 on the fly to accommodate for such changes.

Figure 27:
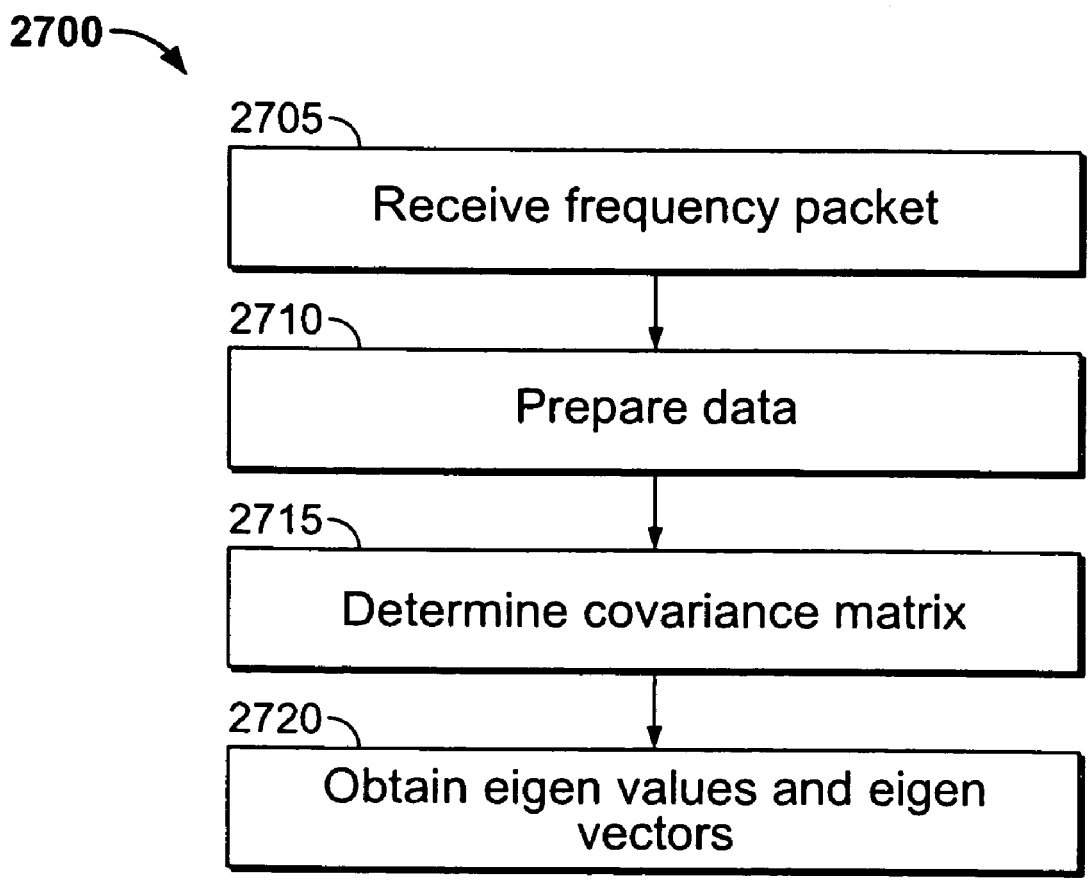

Referring also to FIG. 27, the model of radar detector response is trained prior to use of the mine detection system 100 using a procedure 2700. Initially, data is collected from a trial run in a mine-free region such that the only features present during the trial run are clutter features. Typically, clutter and noise data remain relatively constant from scan to scan and often contain less energy than data obtained from scans of mines. Ultimately, common features among the clutter scans are captured and new scans that display significantly distinct features are considered to contain mines.

Although the scans for data can be applied to many different types of clutter features, the scans for data are based on principal components analysis (PCA), which describes features through principal components, thus permitting automation and enabling adaptation to clutter features in local environments. The number of variables involved in the modelling is reduced and the structure of the relationships between variables can be detected using PCA.

Basically, PCA involves a mathematical procedure that transforms a number of possibly correlated variables into a smaller number of uncorrelated variables that are called principal components. The first principal component accounts for as much of the variability in the data as possible, and each succeeding component accounts for as much of the remaining variability as possible. PCA determines a direction with the most variance and rotates the space such that this direction is now the first dimension. Then, PCA finds the direction with the next largest variance and rotates the space such that this direction is the second dimension. This process continues until all dimensions are accounted for. The result is a new feature space with the same number of dimensions as the original space but with the variance concentrated in the lower order dimensions.

In general, the mathematical technique used in PCA is eigen analysis in which the eigenvalues and the eigenvectors of a square symmetric matrix are solved with sums of squares and cross products. The eigenvector associated with the largest eigenvalue has the same direction as the first principal component. The eigenvector associated with the second largest eigenvalue determines the direction of the second principal component. The sum of the eigenvalues equals the trace of the square matrix and the maximum number of eigenvectors equals the number of rows (or columns) of this matrix.

Referring to FIG. 27, to begin the PCA process, the processor 236 receives the collected data from the trial run in the form of frequency packets (step 2705). Typically, several hundred clutter-only frequency packets are received. Next, the data is prepared (step 2710) and the covariance matrix is determined (step 2715). Then, using single value decomposition, the eigenvalues and eigenvectors are obtained (step 2720).

Referring again to FIG. 26, once the model is trained using the procecedure 2700, the processor 236 can update the model using a procedure 2615. Initially, the data received in the form of frequency packets (step 2605) are prepared (step 2665). Then, the processor 236 processes the prepared data using PCA (step 2670), a procedure further discussed below. Based on the PCA, the processor 236 outputs a preliminary result of whether a mine is present (step 2675).

Figure 28:
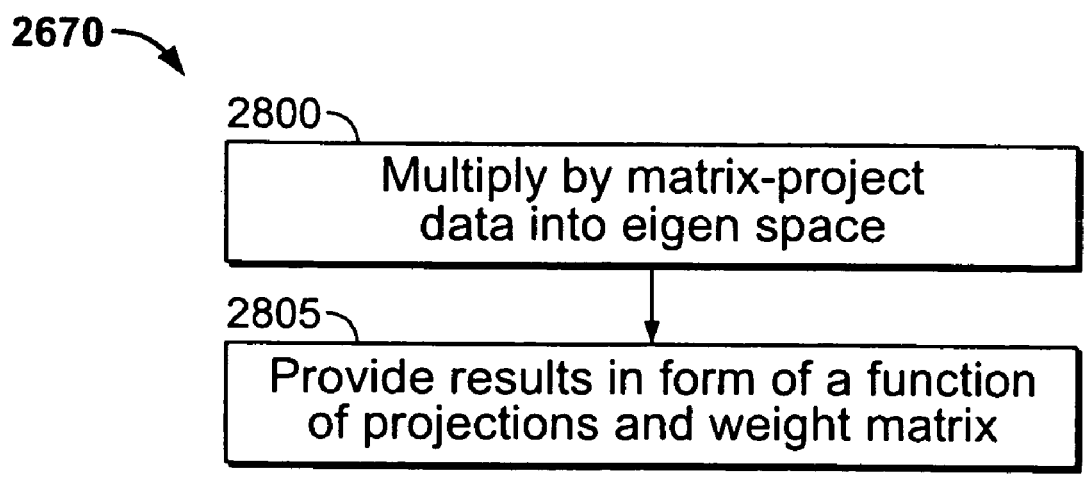

Referring also to FIG. 28, the processor 236 processes the prepared data using a PCA procedure 2670. Initially, the processor 236 projects the prepared data into eigenspace by multiplying the data vector by the eigenvalue matrix (step 2800). Then, the results are provided in the form of a function of the projection of the data and the weight matrix (step 2805).

Figure 29:
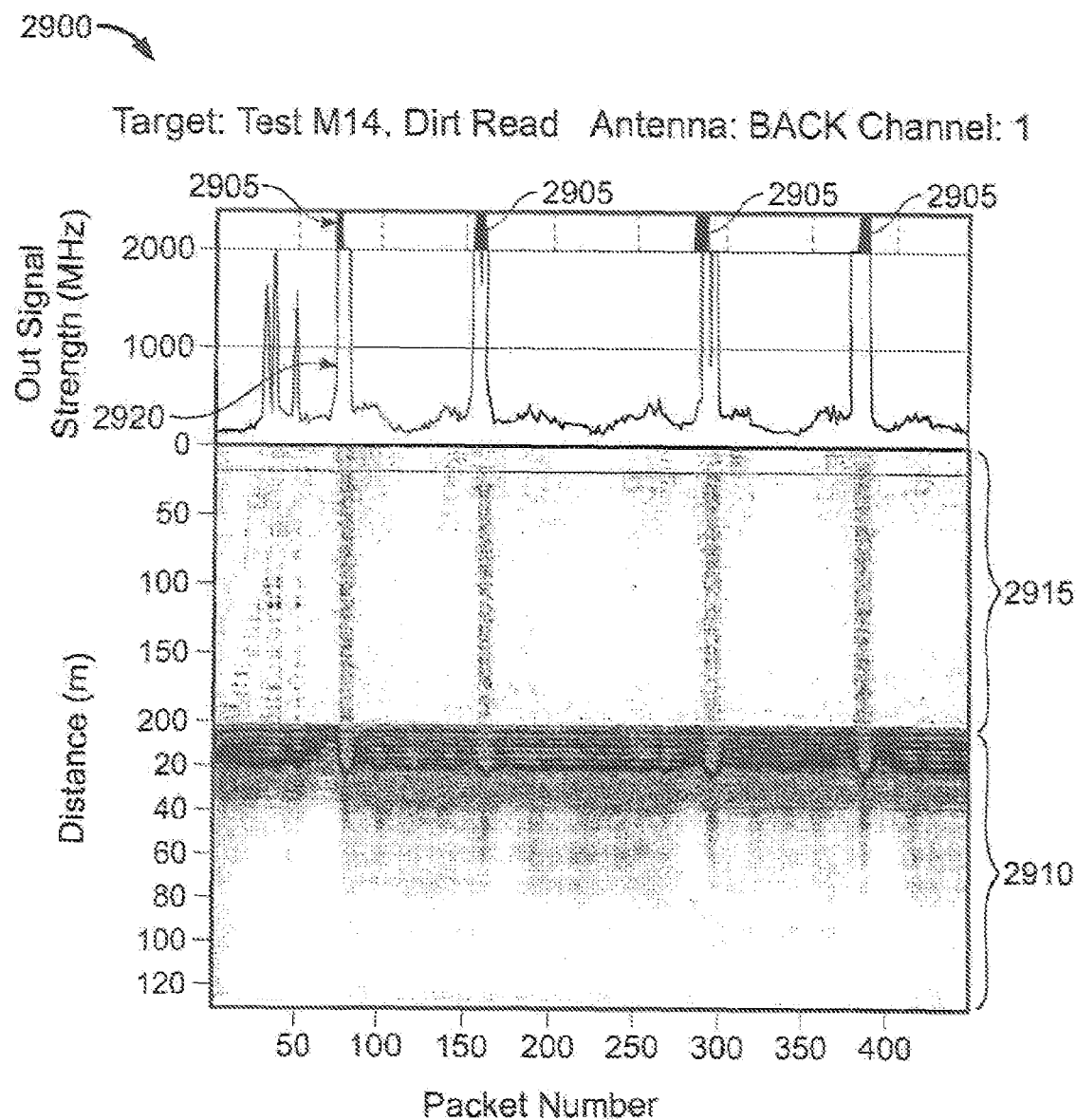
FIG. 29 is a graph of sample results produced by the processor using the procedures of FIGS. 26-28.

Because PCA can safely discard some of the higher order dimensions, noisy sources of variability are removed and the dimensionality of the input is reduced, thus making modelling simpler. Referring to FIG. 29, sample results for PCA in the form of a graph 2900 are shown for various mine locations 2905. Raw data 2910 is input into PCA and PCA outputs a signal 2915 that has a strength measured in the upper graph 2920. As shown, PCA enhances the target-to-clutter signal ratio.

Referring again to FIG. 26, the processor 236 transforms the radar data from the frequency domain to the time domain at step 2620. As discussed above, during operation of the system 100, the radar data is stepped through frequencies. Typically, the range through which the radar is stepped is about one and a half gigahertz. The processor 236 uses Fourier transformation to transform the radar data from the frequency domain to the time domain. Because the data is transformed into the time domain, information about depth (if using two or more antennas) or distance to the mine may be obtained.

The system 100 employs two receiving antennas 275 and 280 to determine the depth of a mine. For example, with a single receiving antenna, an object located five inches directly below the antenna might appear to be in the same time domain location as an object located three inches deep but four inches laterally from the antenna (where the distance from the antenna to the object is still five inches). By using a second receiving antenna, data from the two receiving antennas may be correlated to permit a higher degree of accuracy and to permit a determination of depth.

Referring again to FIG. 26, the processor 236 compares the results of the model analysis, the depth analysis, and the metal detector analysis (step 2630) to make a determination of whether an alert signal should be sent to the audio device 135 or 137 (step 2635). The comparison may determine that the alert signal should be sent even if model analysis provides a weak mine signal if the metal detector analysis signal is strong.

Alternative detection features may be incorporated into a multi-mode landmine detector (MLD). Examples of such alternative detection features include perimeter warning and through wall sensing using Doppler processing for motion detection, along with buried and in-wall cache detection using a variant of the mine detection algorithm and the existing metal detector 1350 and radar detector 1450. Various combinations of separate functions, such as dual mode or even five or more separate functions, may be loaded onto the MLD at the factory to provide the user with the ability to select which of the functions or modes to exercise at any time.

Figure 31:
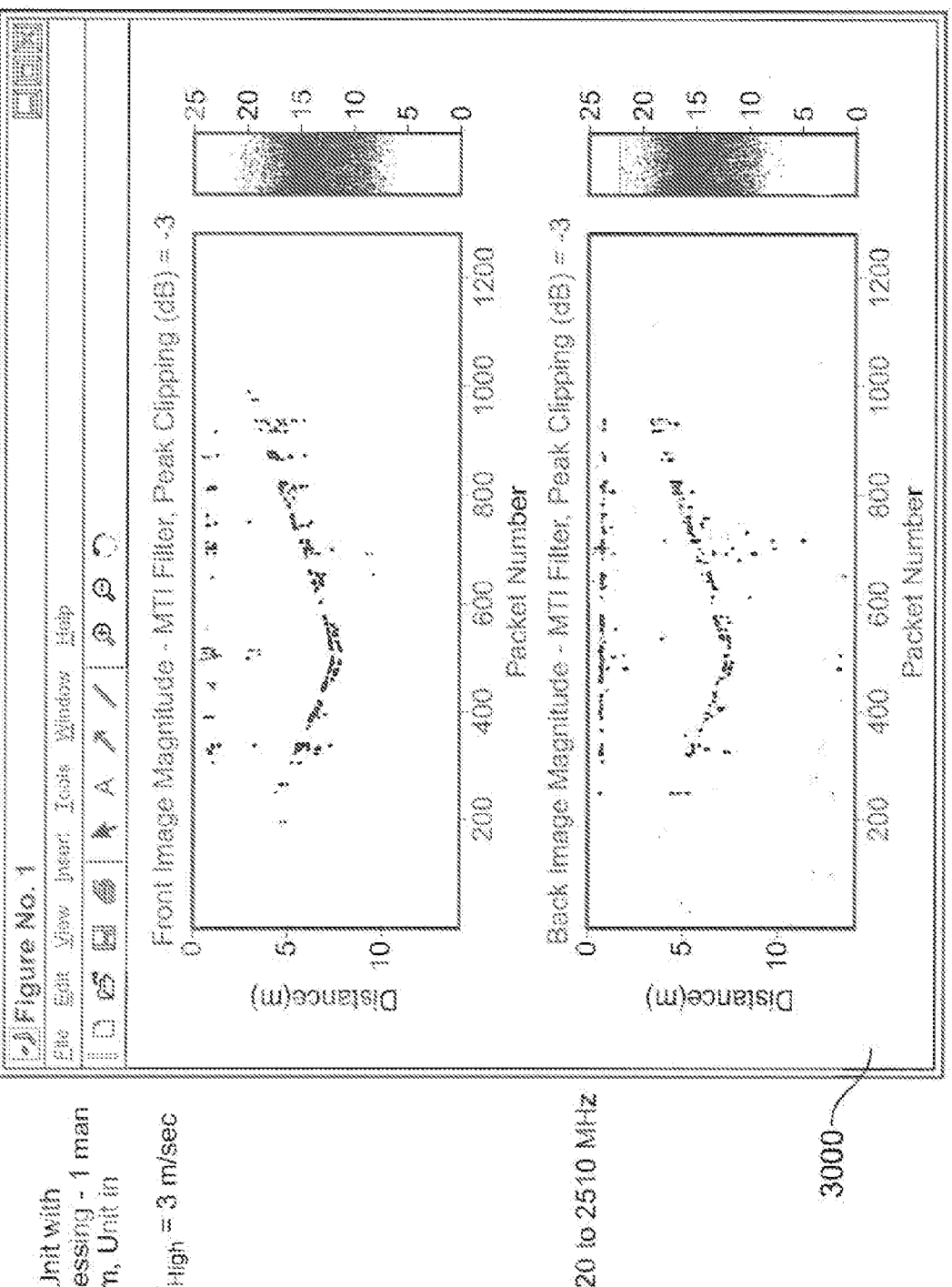
FIG. 31 is a representative view of a display during a through wall detection mode that utilizes Doppler ATR processing when a search device is flush against a wall.
Figure 32:
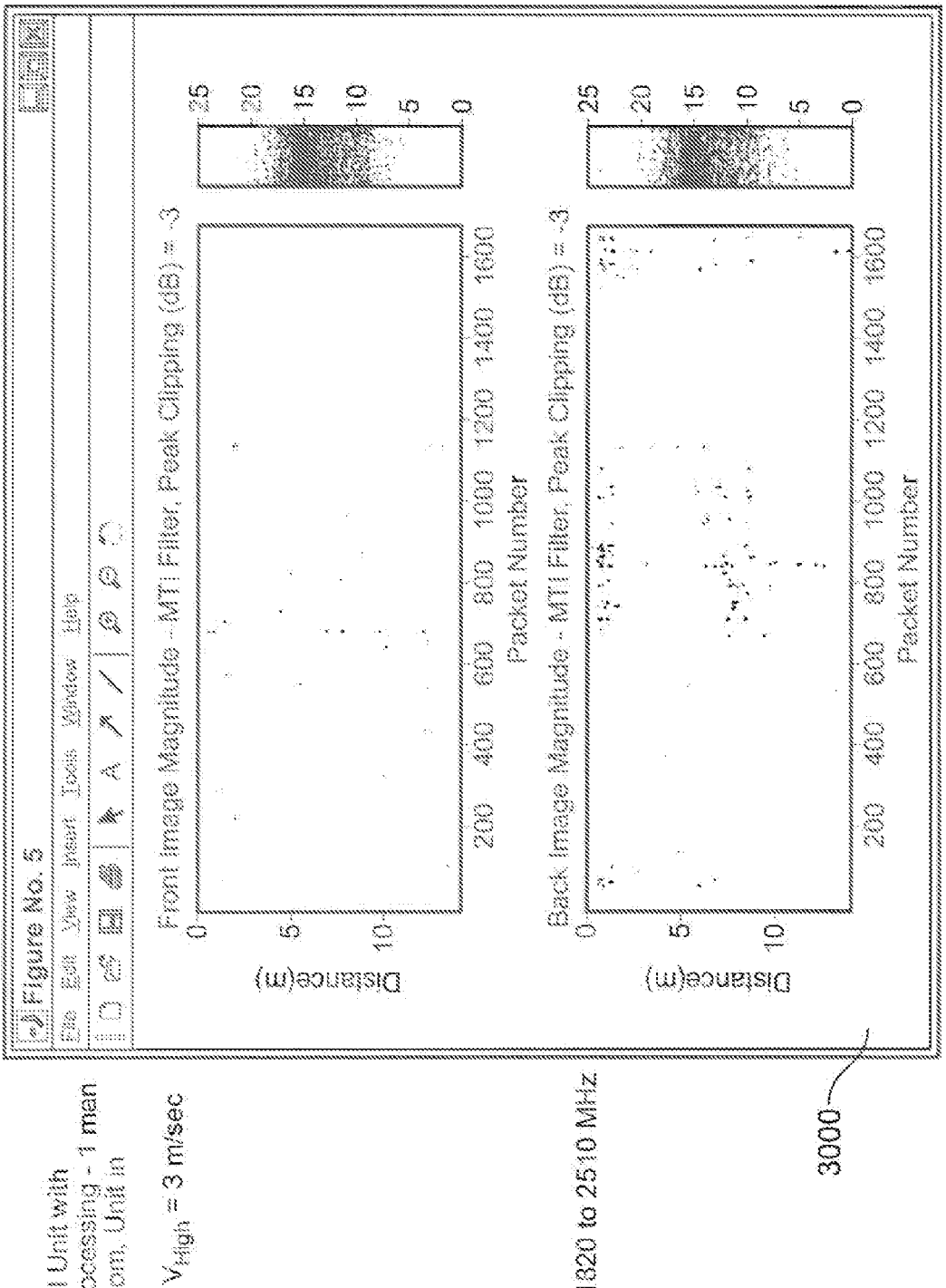
FIG. 32 is a representative view of a display during a through wall detection mode that utilizes Doppler ATR processing when a search device is positioned away from a wall.

A MLD may be identical to the systems described above in user functionality, while also including switches, such as in the control section 400, internal to the device that are brought into play by the user mode selection. The MLD may provide visual or audio warnings of target identification with the control section 400 shown in FIGS. 5 and 6, or as shown in FIGS. 31 and 32, an optional clip-on display 3000 and interface with the control section may be provided for the MLD to permit the operator to view images of target detection results. For example, perimeter warning or through wall sensing may be accomplished via Doppler processing of the radar return, but with the system antenna or sensor head pointing outwards (rather than straight down into the ground when in mine detection mode). The system may be laid on the ground or in a fixture to keep the system still. The long range capability of this mode is over 100 feet.

Figure 30:
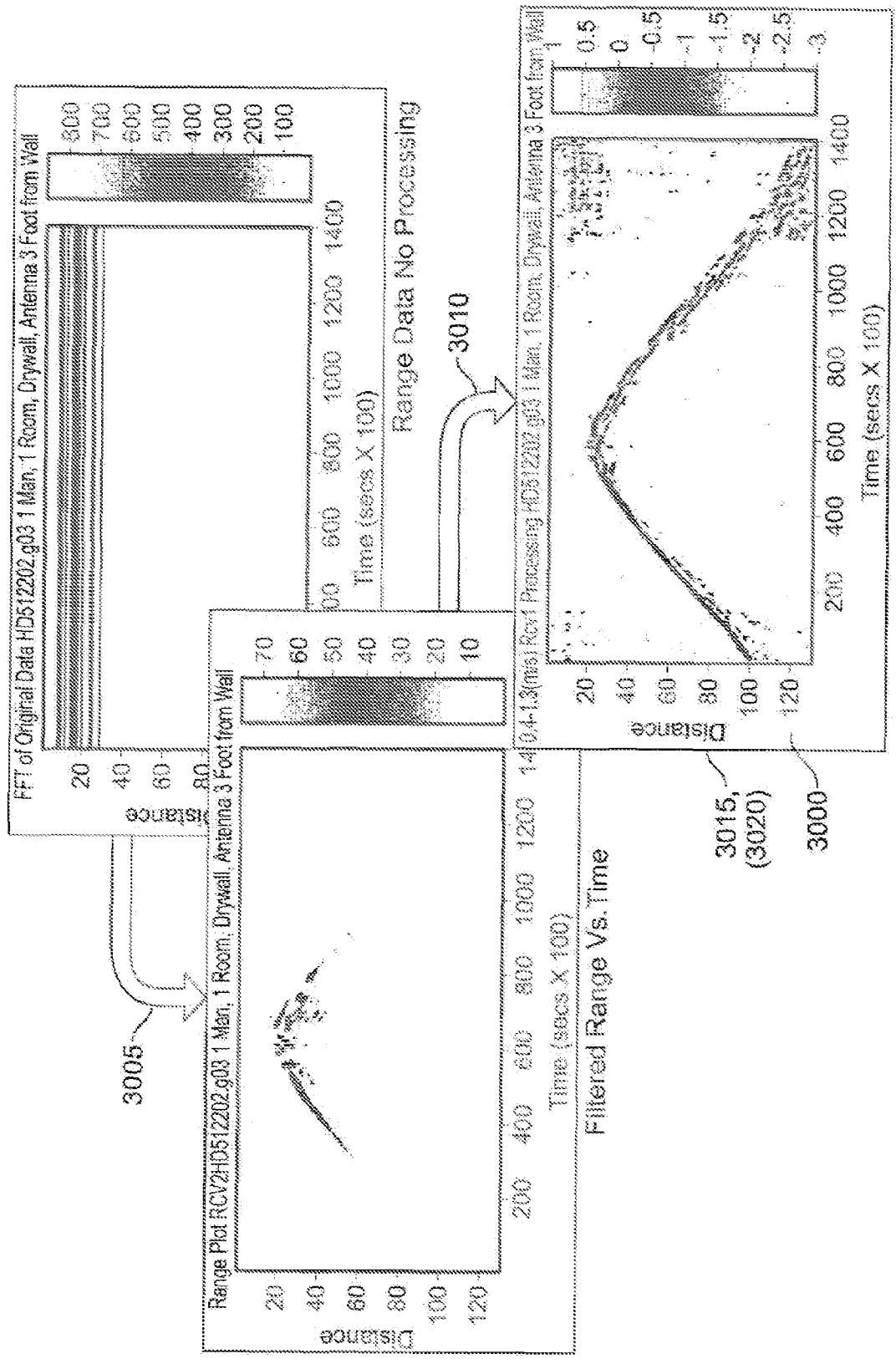
FIG. 30 is a flow chart of an alternative processing procedure that may be performed by the processor of the radar detector within the mine detection system of FIG. 1.

FIG. 30 is a flow chart of an alternative processing procedure that may be performed by the processor of the radar detector within the mine detection system of FIG. 1. As seen in FIG. 30, the data processing steps include a prefiltering step 3005, a simple range and velocity tracking step 3010, an angle calculation 3015 and a plan view display generation step 3020 on a display 3000. In one implementation, the through wall and perimeter (or intrusion) warning modes use Doppler ATR processing. An automatic target recognizer (ATR) is an algorithm that locates potential targets in an image and identifies the types of targets. An ATR algorithm typically includes several processing stages. In the first stage, a target detector, operating on the entire image, detects some potential target areas (target chips). In order to reduce the false-alarm rate, the second stage attempts to reject false target-like objects (clutter) and retain targets. In the third stage, a set of features is first computed and then each target image is classified into one of a number of classes. Most ATR algorithms that have been developed operate on a single frame of still imagery to detect, recognize, and geolocate targets of interest. The introduction of digital motion imagery has facilitated ATR processing of motion imagery that is particularly advantageous for the through wall and perimeter warning operating modes.

FIG. 31 is a representative view of a display 3000 during a through wall detection mode that uses Doppler ATR processing when a search device is flush against a wall. FIG. 32 is a representative view of a display during a through wall detection mode that uses Doppler ATR processing when a search device is positioned away from a wall. Through wall, like perimeter (or intrusion) warning, is also accomplished using Doppler processing. However, through wall processing first includes use of the metal detector to select metal-free wall areas for the radar to pass through. In the through wall mode, the user can then turn off the metal detector so as not to interfere with the audio return of the Doppler processing. FIGS. 31 and 32 show examples of through wall detection of walking persons, first with the sensor head flush against the wall and then at a two foot standoff. Test results of perimeter warning and through wall sensing using Doppler ATR processing produced favorable results, e.g., detection capability of 100 feet or more, when the search device 105 was positioned against or offset (approximately two feet as shown in FIG. 32) from a wall made of drywall, concrete block, reinforced concrete and brick.

Buried cache and in-wall cache detection is accomplished using similar scanning and system training techniques that have been successfully used for the buried land mine detection described in greater detail above with respect to FIGS. 1-29. The scanning method is similar to that described for buried land mine detection with the exception that the search device 105 is moved relative to surfaces that are not necessarily horizontal with respect to the operator, e.g., the vertical and horizontal walls of a cave. The radar system technology used for this multi-mode landmine detector can also be separated into discrete, application specific devices or systems, depending on user preference. In fact, any combination of one, two, three or four modes can be designed into the hardware or software for separate products.

Figure 33:
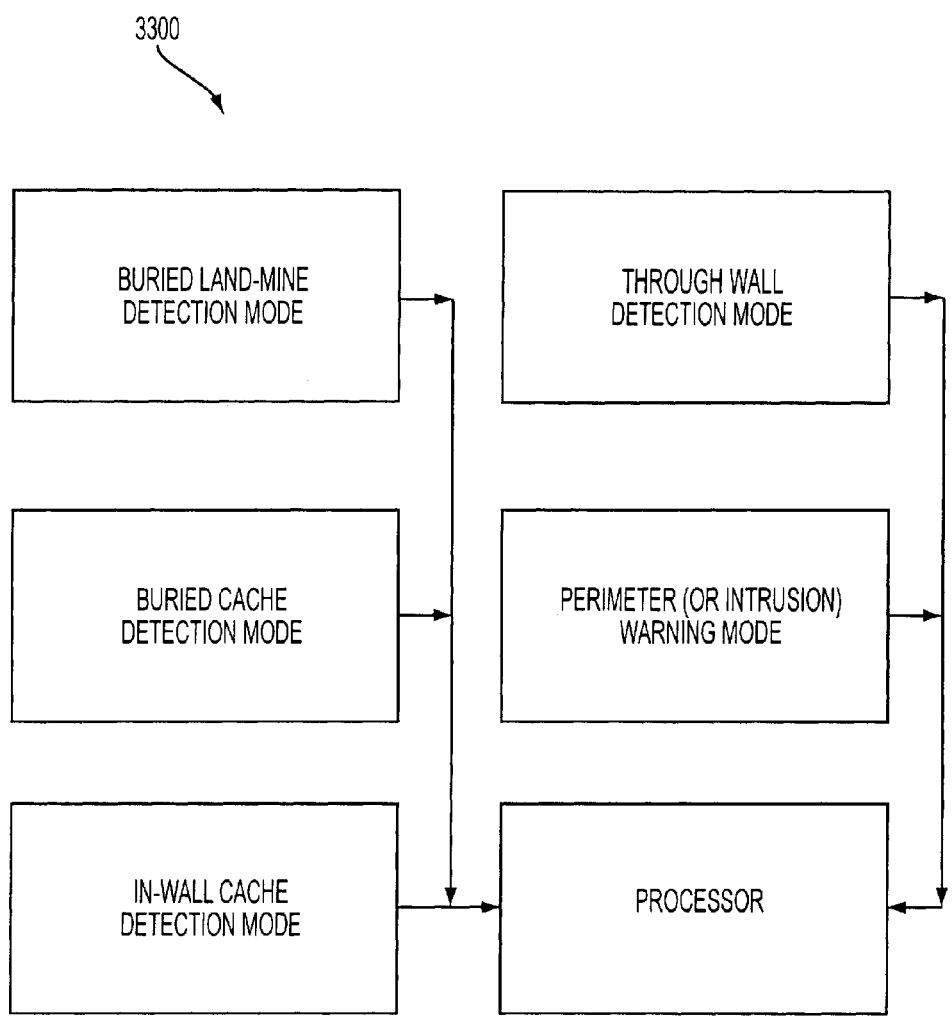
FIG. 33 is a schematic view showing a selection device for a mine detection system having a plurality of operating modes.

FIG. 33 is a schematic view showing a selection device 3300 for a mine detection system having multiple operating modes. The selection device permits an operator to select between a variety of operating modes. For example, five operating modes are shown but any combination of operating modes may be preloaded into the mine detection system at the factory. Selecting an operating mode causes the system to designate a predetermined process for analyzing data during the selected mode. Accordingly, the processor(s) operatively connected to the radar detector and the metal detector will employ slightly different processing schemes, such as Doppler processing, during the through wall detection and perimeter warning modes. The selection of either of these two modes will therefore initiate a process for analyzing data that is different than those processes (FIG. 26) used for the buried mine, buried cache and in-wall cache detection modes.

Other implementations are within the scope of the following claims.

What is claimed is:

1. A multi-mode target detection system comprising:
a ground penetrating metal detector;
a ground penetrating radar detector; and
a control section having a selection device for selecting between a buried land mine detection mode and a through wall detection mode.

2. The system of claim 1, wherein the ground penetrating metal detector comprises:
a transmitter,
a coil coupled to the transmitter to produce a magnetic field; and
a signal processor coupled to the coil and configured to detect a secondary magnetic field.

3. The system of claim 1, wherein the ground penetrating radar detector comprises:
a radio frequency generator; and
a radio frequency transmitter coupled to the radio frequency generator to transmit radio-wave signals toward the ground.

4. The system of claim 3, wherein the ground penetrating radio detector comprises:
a radio frequency receiver to receive radio-wave signals from the ground, and
a signal processor coupled to the radio frequency receiver to detect the radio-wave signals, wherein the radio frequency receiver includes an antenna.

5. The system of claim 1, wherein operating modes supported by the control section include all of the buried land mine detection mode, the through wall detection mode, a perimeter warning mode, a buried cache detection mode and an in-wall cache detection mode.

6. The system of claim 1, wherein the metal detector includes a coil that produces a magnetic field and the radar detector includes a transmitting antenna to transmit radio-wave signals toward the ground and a receiving antenna to receive radio-wave signals reflected from objects within the ground.

7. The system of claim 6, wherein the antennas are surrounded by the coil and the antennas are shielded from external electromagnetic radiation.

8. The system of claim 1, further comprising an output device that outputs a signal indicating a presence of an object if either the ground penetrating metal detector, the ground penetrating radar detector, or both detect the presence of the object.

9. The system of claim 1, wherein the ground penetrating radar detector and the ground penetrating metal detector are housed in a single housing and operation of the metal detector does not interfere with operation of the radar detector.

10. The system of claim 1, further comprising an output device for indicating a detection of a target in the buried land mine detection mode and the through wall detection mode.

11. The system of claim 10, wherein the output device includes a visual display.

12. The system of claim 10, wherein the output device includes an audio or visual alarm.

13. The system of claim 1 wherein operating modes supported by the control section include a perimeter warning mode.

14. The system of claim 1 wherein operating modes supported by the control section include a buried cache detection mode.

15. The system of claim 1 wherein operating modes supported by the control section include an in-wall cache detection mode.

16. A target detection system comprising:
an integrated search device housing a radio-wave transmitter and a metal detector coil;
a first set of electronic components coupled to the radio transmitter;
a second set of electronic components coupled to the metal detector coil; and
a processor for detecting a target through a buried land mine detection mode and a through wall detection mode.

17. The system of claim 16 further comprising a radio-wave receiver, wherein the radio-wave transmitter and receiver are shielded from external electro-magnetic radiation.

18. The system of claim 16, wherein operating modes supported by the processor include all of the buried land mine detection mode, the through wall detection mode, a perimeter warning mode, a buried cache detection mode and an in-wall cache detection mode.

19. The system of claim 16 further comprising an output device for indicating a detection of a target in the buried land mine detection mode and the through wall detection mode.

20. The system of claim 19, wherein the output device includes a visual display.

21. The system of claim 19, wherein the output device includes an audio or visual alarm.

22. A method of detecting targets in a multi-mode target detection system, the method comprising:
selecting, for a multi-mode target detection system having a metal detector and a radar detect or an operating mode for detecting a target, wherein the operating mode is selected between a buried land mine detection mode and a through wall detection mode;
transmitting radio-wave frequency energy into a surrounding region;
detecting radio-wave frequency energy reflected by an object in the surrounding region; and
analyzing data obtained from transmitting and detecting radio-wave frequency to detect the target in the selected operating mode.

23. The method according to claim 22, wherein selecting the operating mode comprises initiating a predetermined data processing step for the selected operating mode.

24. A method of detecting targets comprising:
providing a detection system having a metal detector and a radar detector for collecting and analyzing data taken from a surrounding region;
selecting an operating mode for detecting a target, wherein the operating mode is selected between a buried land mine detection mode and a through wall detection mode; and
detecting the target with the detection system.

25. The method of claim 24, wherein detecting the target with the detection system further comprises:
analyzing data taken from the surrounding region using the metal detector, and
analyzing data taken from the surrounding region using the radar detector.

26. The method of claim 24 further comprising training the detection system using a principal components analysis of background clutter data.

27. The method of claim 24, wherein:
the selected operating mode includes the through wall detection mode, and
detecting the target with the detection system includes doppler processing of data from the radar detector.

28. The method of claim 27, wherein doppler processing of data from the radar detector is performed during the through wall detection.

29. The method of claim 24, wherein detecting the target with the detection system during the through wall detection mode further comprises analyzing data taken from the surrounding region using the metal detector.

30. The method of claim 24 further comprising automatically adapting the detection system to the surrounding region to determine whether a target is present in the surrounding region.

31. The method of claim 30, wherein adapting the detection system includes using a principal components analysis of the data taken from the surrounding region.

32. The method of claim 24 further comprising:
analyzing data taken from the surrounding region using a metal detector,
analyzing data taken from the surrounding region using a radar detector based on training the detection system using a principal components analysis of background clutter data, and
analyzing a depth of an object detected by the radar detector using the data.

33. The method of claim 32, wherein analyzing the depth of the object includes transforming data from the radar detector from the frequency domain to the time domain.

34. The method of claim 32, wherein analyzing the depth includes receiving data from two or more antennas of the radar detector.

35. The method of claim 32, wherein analyzing data taken from the surrounding region using the radar detector includes using a principal component analysis of the data.

* * * * *